United States Patent
Noda et al.

(10) Patent No.: US 11,912,889 B2
(45) Date of Patent: Feb. 27, 2024

(54) SILICON-CONTAINING POLYMER, FILM-FORMING COMPOSITION, METHOD FOR FORMING SILICON-CONTAINING POLYMER COATING, METHOD FOR FORMING SILICA COATING, AND PRODUCTION METHOD FOR SILICON-CONTAINING POLYMER

(71) Applicant: TOKYO OHKA KOGYO CO., LTD., Kanagawa (JP)

(72) Inventors: Kunihiro Noda, Kanagawa (JP); Takehiro Seshimo, Kanagawa (JP); Dai Shiota, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 176 days.

(21) Appl. No.: 17/607,182

(22) PCT Filed: May 13, 2020

(86) PCT No.: PCT/JP2020/019147
§ 371 (c)(1),
(2) Date: Oct. 28, 2021

(87) PCT Pub. No.: WO2020/230828
PCT Pub. Date: Nov. 19, 2020

(65) Prior Publication Data
US 2022/0220338 A1    Jul. 14, 2022

(30) Foreign Application Priority Data
May 14, 2019 (JP) .................................. 2019-091539

(51) Int. Cl.
| C08G 77/60 | (2006.01) |
| B05D 3/02 | (2006.01) |
| C09D 183/16 | (2006.01) |
| C09D 183/08 | (2006.01) |

(52) U.S. Cl.
CPC ........... C09D 183/16 (2013.01); C08G 77/60 (2013.01); C09D 183/08 (2013.01)

(58) Field of Classification Search
CPC ...... C08G 77/60; C08G 77/28; C08G 77/392; C09D 183/02; C09D 183/08; B05D 3/02
See application file for complete search history.

(56) References Cited

U.S. PATENT DOCUMENTS

| 2,515,857 | A |   | 7/1950 | William et al. |
| 3,635,887 | A |   | 1/1972 | Polmanteer |
| 3,729,444 | A | * | 4/1973 | Bey et al. ............... D21H 17/59 556/427 |
| 3,884,860 | A | * | 5/1975 | Brown ..................... C08L 63/00 556/427 |
| 5,412,133 | A | * | 5/1995 | Eckberg ............... C08G 77/392 556/427 |
| 2009/0098082 | A1 |   | 4/2009 | Wilson et al. |

FOREIGN PATENT DOCUMENTS

| CN | 105601928 A | * | 5/2016 |
| EP | 0 618 280 A2 | | 10/1994 |
| EP | 2 105 454 A1 | | 9/2009 |
| GB | 688408 A | | 3/1953 |
| JP | S55-139390 A | | 10/1980 |
| JP | H06-287533 A | | 10/1994 |
| JP | 2008-508406 A | | 3/2008 |
| JP | 2015-108087 A | | 6/2015 |
| JP | 2017-092433 A | | 5/2017 |
| WO | 2006-013060 A1 | | 2/2006 |
| WO | 2016-111210 A1 | | 7/2016 |

OTHER PUBLICATIONS

Machine translation of CN 105601928 (no date).*

* cited by examiner

Primary Examiner — Marc S Zimmer
(74) Attorney, Agent, or Firm — Pearne & Gordon LLP

(57) ABSTRACT

The present invention aims to provide: a novel silicon-containing polymer that is alkali soluble or is soluble in an alkaline aqueous solution by using heat, etc.; a film-forming composition including the silicon-containing polymer; a method for forming a silicon-containing polymer coating using the film-forming composition; a method for forming a silica coating using the film-forming composition; and a production method for the silicon-containing polymer. The silicon-containing polymer including at least either a polysiloxane chain or oligosiloxane chain or a polysilane chain or oligosilane chain in the molecular chain thereof has a group that has e.g., a carboxy or carboxylic acid ester group and a sulfide group, introduced to the molecular chain as a result of an ene-thiol reaction.

12 Claims, No Drawings

SILICON-CONTAINING POLYMER, FILM-FORMING COMPOSITION, METHOD FOR FORMING SILICON-CONTAINING POLYMER COATING, METHOD FOR FORMING SILICA COATING, AND PRODUCTION METHOD FOR SILICON-CONTAINING POLYMER

TECHNICAL FIELD

The present invention relates to a silicon-containing polymer, a film-forming composition including the silicon-containing polymer, a method for forming a silicon-containing polymer coating using the film-forming composition, a method for forming a silica-based coating using the film-forming composition, and a production method for the above-described silicon-containing polymer.

BACKGROUND ART

Silica-based coatings are used in various applications, for example, interlayer insulating films in various elements, sealing materials in light-emitting devices such as LED devices and organic EL devices, coated films for diffusing an impurity across semiconductor substrates, and gap-filling material for semiconductor processing. Such silica-based coatings are typically formed by applying a liquid composition containing a silicon-containing resin, such as a siloxane resin, to a substrate to form a coated film and then baking the resulting coated film.

As materials for forming coated films used when forming such silica-based coatings, a liquid composition including a siloxane resin with a particular structure, silica, and an organic solvent is known, for example (Patent Document 1).

Patent Document 1: Japanese Unexamined Patent Application, Publication No. 2015-108087

DISCLOSURE OF THE INVENTION

Problems to be Solved by the Invention

In order to form a silica-based coating film, when forming a coated film using a composition as described in, for example, Patent Document 1, thickness of the coated film may be uneven or the coated film may stick out from a desired region and fail to form the coated film, in some cases. In such a case, the coated film can be peeled off using an organic solvent. However, in such a peeling process of a coated film, it is required that the coated film can be peeled off with an alkaline aqueous release solution rather than an organic solvent, from the viewpoint of cost and safety.

For this reason, there is a need for a silicon-containing polymer that is soluble in an alkaline aqueous peeling solution or that becomes soluble by heating or other means.

The present invention was made in view of the above problem, and an object thereof is to provide a novel silicon-containing polymer that is soluble in an alkaline solution or that becomes soluble in an alkaline aqueous solution by heating or other means; a film-forming composition including the silicon-containing polymer; a method for forming a silicon-containing polymer coating using the film-forming composition; a method for forming a silica-based coating using the film-forming composition; and a method for producing the above-described silicon-containing polymer.

Means for Solving the Problems

Present inventors have found that the above problem could be solved by introducing, in a silicon-containing polymer including at least one of poly-siloxane chain or oligo-siloxane chain and poly-silane chain or oligo-silane chain in a molecular chain, a group having a carboxy or carboxy ester group and a sulfide group into the molecular chain, for example, by an ene-thiol reaction, thereby completing the present invention. More particularly, the present invention provides the following.

A first aspect of the present invention is a silicon-containing polymer including at least one of poly-siloxane chain or oligo-siloxane chain and poly-silane chain or oligo-silane chain in a molecular chain,
wherein one or more groups represented by the following formula (1) are bound onto a silicon atom in the silicon-containing polymer;

$$-R^1-S-R^2-(CO-O-R^3)_n \qquad (1)$$

wherein, in the formula (1), $R^1$ and $R^2$ are each independently a hydrocarbon group having 1 or more and 10 or less carbon atoms, $R^3$ is a hydrogen atom or an organic group bonding to the oxygen atom via a C—O bond and having 1 or more and 20 or less carbon atoms, and n is 1 or 2.

A second aspect of the present invention is a film-forming composition including the silicon-containing polymer (A) according to the first aspect and a solvent (S).

A third aspect of the present invention is a method for forming a silicon-containing polymer coating, the method including:
forming a coated film by applying the above-described film-forming composition on a substrate, and
drying the coated film.

A fourth aspect of the present invention is a method for forming a silica-based coating, the method including:
forming a coated film by applying the film-forming composition according to the second aspect on a substrate, and
drying the coated film to form a silicon-containing polymer coating and then baking the silicon-containing polymer coating or baking the coated film.

A fifth aspect of the present invention is a method for producing the silicon-containing polymer according to the first aspect,
the method including performing an ene-thiol reaction between a precursor polymer including at least one of a poly-siloxane chain or oligo-siloxane chain and a poly-silane chain or oligo-silane chain in a molecular chain, and including an unsaturated hydrocarbon group represented by the following formula (2-I):

$$-R^4-CR^5=CH_2 \qquad (2\text{-}I),$$

wherein, in the formula (2-I), $R^4$ is a single bond or a hydrocarbon group having 1 or more and 8 or less carbon atoms, $R^5$ is a hydrogen atom or a hydrocarbon group having 1 or more and 8 or less carbon atoms, and in cases where both $R^4$ and $R^5$ are hydrocarbon groups, the sum of the number of carbon atoms in the hydrocarbon group as $R^4$ and the number of carbon atoms in the hydrocarbon group as $R^5$ is 2 or more and 8 or less, or a mercapto group-containing group represented by the following formula (2-II):

$$-R^1-SH \qquad (2\text{-}II),$$

wherein, in the formula (2-II), $R^1$ is the same as the $R^1$ in the formula (1),
being bound onto a silicon atom, and
a carboxylic acid derivative represented by the following formula (1-I):

$$HS-R^2-(CO-O-R^3)_n \qquad (1\text{-}I),$$

wherein in the formula (1-I), $R^2$, $R^3$, and n are the same as the $R^2$, $R^3$, and n in the formula (1), or the unsaturated group-containing compound represented by the formula (1-II):

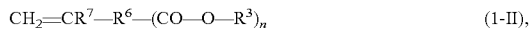

$$CH_2=CR^7-R^6-(CO-O-R^3)_n \qquad (1\text{-II}),$$

wherein, in the formula (1-II), $R^3$ and n are the same as the $R^3$ and n in the formula (1), $R^6$ is a single bond or a hydrocarbon group having 1 or more and 8 or less carbon atoms, $R^7$ is a hydrogen atom or a hydrocarbon group having 1 or more and 8 or less carbon atoms, and in cases where both $R^6$ and $R^7$ are hydrocarbon groups, the sum of the number of carbon atoms in the hydrocarbon group as $R^6$ and the number of carbon atoms in the hydrocarbon group as $R^7$ is 2 or more and 8 or less.

Effects of the Invention

The present invention makes it possible to provide a novel silicon-containing polymer that is soluble in an alkaline solution or that becomes soluble in an alkaline aqueous solution by heating or other means, a film-forming composition including the silicon-containing polymer, a method for forming a silicon-containing polymer coating using the film-forming composition, a method for forming a silica-based coating using the film-forming composition, and a production method for the above-described silicon-containing polymer.

PREFERRED MODE FOR CARRYING OUT THE INVENTION

«Silicon-Containing Polymer»

The silicon-containing polymer includes at least one of poly-siloxane chain or oligo-siloxane chain and poly-silane chain or oligo-silane chain in a molecular chain. In the silicon-containing polymer, one or more groups represented by the following formula (1) are bound onto a silicon atom. The formula (1) is represented by the following formula:

$$-R^1-S-R^2-(CO-O-R^3)_n \qquad (1).$$

In the formula (1), $R^1$ and $R^2$ are each independently a hydrocarbon group having 1 or more and 10 or less carbon atoms. $R^3$ is a hydrogen atom or an organic group being bound to the oxygen atom via a C—O bond and having 1 or more and 20 or less carbon atoms. n is an integer of 1 or 2.

The silicon-containing polymer has a group represented by the above formula (1). Therefore, the silicon-containing polymer is soluble in an alkaline solution or becomes soluble in an aqueous alkaline solution by heating or other means.

Due to the ease of producing a silicon-containing polymer and the ease of their utilizing properties as polysilane and polysiloxane, it is preferred that the molecular chain of the silicon-containing polymer consists of only the poly-siloxane chain or the oligo-siloxane chain or consists of only the poly-silane chain or the oligo-silane chain.

The structure of the molecular chain of a silicon-containing polymer is not particularly limited. The structure of the molecular chain may have a linear structure, a branched chain structure, a network structure, or a cyclic structure. Due to the ease of controlling the molecular weights and adjusting various physical properties of a silicon-containing polymer, the structure of the molecular chain of a silicon-containing polymer is preferably linear. It should be noted that the silicon-containing polymer may be combined with a molecule having a different molecular chain structure. The silicon-containing polymer may include, for example, a combination of a linear molecule and a branched molecule.

The poly-siloxane chain or oligo-siloxane chain and the poly-silane chain or oligo-silane chain will now be described.

<Poly-Siloxane Chain or Oligo-Siloxane Chain>

The structure of poly-siloxane chain or oligo-siloxane chain in a silicon-containing polymer is not particularly limited, so long as the silicon-containing polymer has a group represented by the above formula (1).

The poly-siloxane chain or oligo-siloxane chain is preferably, for example, poly-siloxane chain or oligo-siloxane chain obtained by hydrolytic condensation of at least one selected from silane compounds represented by the following formula (A1):

$$R_{4-m}Si(OR')_m \qquad (A1)$$

In the formula (A1), R represents a hydrogen atom, a group represented by the above formula (1), an aliphatic hydrocarbon group, an aryl group, or an aralkyl group. R' represents an alkyl group or a phenyl group. m represents an integer of 2 or more and 4 or less. When a plurality of Rs are bound to Si, the plurality of Rs may be the same or different from each other. A plurality of (OR') groups bound to Si may also be the same or different from each other.

The aliphatic hydrocarbon group as R is preferably a linear or branched aliphatic hydrocarbon group having 1 or more and 20 or less carbon atoms, more preferably a linear or branched aliphatic hydrocarbon group having 1 or more and 4 or less carbon atoms. The aliphatic hydrocarbon group as R may have one or more unsaturated bonds. As the aliphatic hydrocarbon group as R, for example, a methyl group, an ethyl group, an n-propyl group, an isopropyl group, an n-butyl group, an isobutyl group, a sec-butyl group, a tert-butyl group, a vinyl group, an allyl group, and the like are preferable.

When R is an aryl group or an aralkyl group, the aryl groups contained in these groups are not particularly limited, so long as the object of the present invention is not defeated. Suitable examples of the aryl group include the following groups.

[Chem. 1]

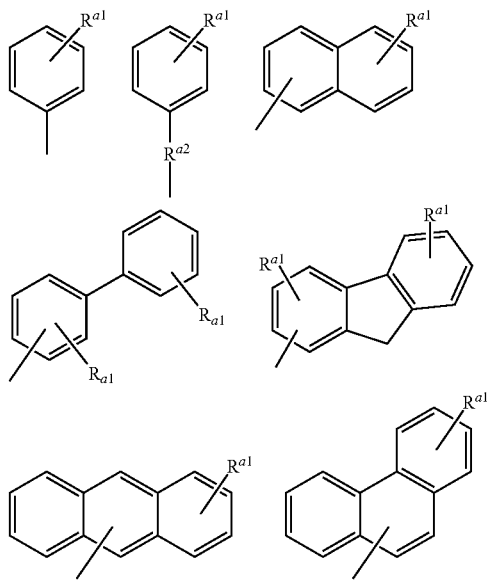

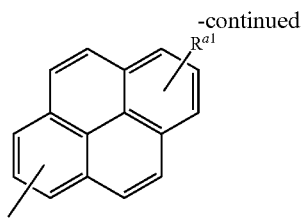

Among the groups represented by the above formulae, the groups represented by the following formulae are preferable.

[Chem. 2]

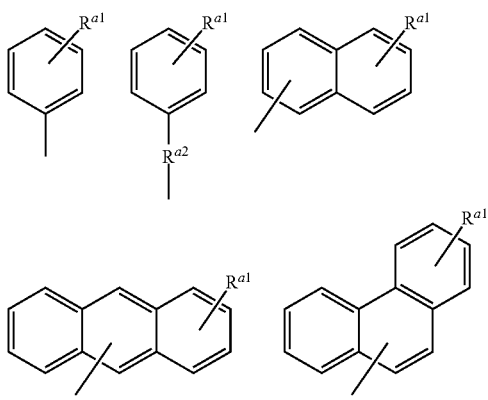

In the above formulae, $R^{a1}$ is a hydrogen atom; a hydroxy group; an alkoxy group such as a methoxy group, an ethoxy group, a butoxy group, or a propoxy group; or a hydrocarbon group such as a methyl group, an ethyl group, a butyl group, or a propyl group. In the above formulae, $R_{a2}$ is an alkylene group such as a methylene group, an ethylene group, a propylene group, or a butylene group.

When R is an aryl group or an aralkyl group, suitable specific examples include a benzyl group, a phenethyl group, a phenyl group, a naphthyl group, an anthracenyl group, a phenanthryl group, a biphenylyl group, a fluorenyl group, a pyrenyl group, and the like.

The number of benzene rings in the aryl group or the aralkyl group is preferably 1 to 3. When the number of benzene rings is 1 to 3, it is easy to form a poly-siloxane chain or oligo-siloxane chain. The aryl group or the aralkyl group may have a hydroxy group as a substituent.

The alkyl group as R' is preferably a linear or branched alkyl group having 1 or more and 5 or less carbon atoms. The number of carbon atoms in the alkyl group as R' is preferably 1 or 2, particularly in terms of the hydrolysis rate. When m is 4 in the formula (A1), the resulting silane compound (i) is represented by the following formula (A2).

$$Si(OR^{41})_a(OR^{42})_b(OR^{43})_c(OR^{44})_d \qquad (A2)$$

In the formula (A2), $R_{41}$, $R^{42}$, $R^{43}$, and $R^{44}$ each independently represent the same alkyl group or phenyl group as in R' above.

a, b, c, and d are integers that satisfy $0 \leq a \leq 4$, $0 \leq b \leq 4$, $0 \leq c \leq 4$, $0 \leq d \leq 4$, and $a+b+c+d=4$.

When m is 3 in the formula (A1), the resulting silane compound (ii) is represented by the following formula (A3).

$$R^{45}Si(OR^{46})_e(OR^{47})_f(OR^{48})_g \qquad (A3)$$

In the formula (A3), $R^{45}$ represents a hydrogen atom, a group represented by the above formula (1), or the same aliphatic hydrocarbon group, aryl group, or aralkyl group as in R above. $R^{46}$, $R^{47}$, and $R^{48}$ each independently represent the same alkyl group or phenyl group as in R' above.

e, f, and g are integers that satisfy $0 \leq e \leq 3$, $0 \leq f \leq 3$, $0 \leq g \leq 3$, and $e+f+g=3$.

When m is 2 in the formula (A1), the resulting silane compound (iii) is represented by the following formula (A4).

$$R^{49}R^{410}Si(OR^{411})_h(OR^{412})_i \qquad (A4)$$

In the formula (A4), $R^{49}$ and $R^{410}$ represent a hydrogen atom, a group represented by the above formula (1), or the same aliphatic hydrocarbon group, aryl group, or aralkyl group as in R above. $R^{411}$ and $R^{412}$ each independently represent the same alkyl group or phenyl group as in R' above.

h and i are integers that satisfy $0 \leq h \leq 2$, $0 \leq i \leq 2$, and $h+i=2$.

Specific examples of the silane compound (i) include tetraalkoxysilanes such as tetramethoxysilane, tetraethoxysilane, tetrapropoxysilane, tetrabutoxysilane, tetrapentyloxysilane, tetraphenyloxysilane, trimethoxymonoethoxysilane, dimethoxydiethoxysilane, triethoxymonomethoxysilane, trimethoxymonopropoxysilane, monomethoxytributoxysilane, monomethoxytripentyloxysilane, monomethoxytriphenyloxysilane, dimethoxydipropoxysilane, tripropoxymonomethoxysilane, trimethoxymonobutoxysilane, dimethoxydibutoxysilane, triethoxymonopropoxysilane, diethoxydipropoxysilane, tributoxymonopropoxysilane, dimethoxymonoethoxymonobutoxysilane, diethoxymonomethoxymonobutoxysilane, diethoxymonopropoxymonobutoxysilane, dipropoxymonomethoxymonoethoxysilane, dipropoxymonomethoxymonobutoxysilane, dipropoxymonoethoxymonobutoxysilane, dibutoxymonomethoxymonoethoxysilane, dibutoxymonoethoxymonopropoxysilane, and monomethoxymonoethoxymonopropoxymonobutoxysilane. Among these, tetramethoxysilane and tetraethoxysilane are preferable.

Specific examples of the silane compound (ii) include hydrosilane compounds such as trimethoxysilane, triethoxysilane, tripropoxysilane, tripentyloxysilane, triphenyloxysilane, dimethoxymonoethoxysilane, diethoxymonomethoxysilane, dipropoxymonomethoxysilane, dipropoxymonoethoxysilane, dipentyloxylmonomethoxysilane, dipentyloxymonoethoxysilane, dipentyloxymonopropoxysilane, diphenyloxylmonomethoxysilane, diphenyloxymonoethoxysilane, diphenyloxymonopropoxysilane, methoxyethoxypropoxysilane, monopropoxydimethoxysilane, monopropoxydiethoxysilane, monobutoxydimethoxysilane, monopentyloxydiethoxysilane, and monophenyloxydiethoxysilane; methylsilane compounds such as methyltrimethoxysilane, methyltriethoxysilane, methyltripropoxysilane, methyltripentyloxysilane, methyltriphenyloxysilane, methylmonomethoxydiethoxysilane, methylmonomethoxydipropoxysilane, methylmonomethoxydipentyloxysilane, methylmonomethoxydiphenyloxysilane, methylmethoxyethoxypropoxysilane, and methylmonomethoxymonoethoxymonobutoxysilane; ethylsilane compounds such as ethyltrimethoxysilane, ethyltriethoxysilane, ethyltripropoxysilane, ethyltripentyloxysilane, ethyltriphenyloxysilane, ethylmonomethoxydiethoxysilane, ethylmonomethoxydipropoxysilane, ethylmonomethoxydipentyloxysilane, ethylmonomethoxydiphenyloxysilane, ethylmethoxyethoxypropoxysilane, and ethylmonomethoxymonoethoxymonobutoxysilane; propyl-silane compounds such as propyltrimethoxysilane, propyltriethoxysilane, propyltripropoxysilane, propyltripentyloxysilane, and propyltriphenyloxysilane, propylmonomethoxydiethoxysilane, propylmonomethoxydipropoxysilane, propylmonomethoxydipentyloxysilane, propylmonomethoxydiphenyloxysilane, propylmethoxyethoxypropoxysilane, and propylmonomethoxymonoethoxymonobutoxysilane; butylsilane compounds such as butyltrimethoxysilane, butyltriethoxysilane, butyltripropoxysilane, butyltripentyloxysilane, butyltriphenyloxysilane, butylmonomethoxydiethoxysilane, butylmonomethoxydipropoxysilane, butylmonomethoxydipentyloxysilane, butylmonomethoxydiphenyloxysilane, butylmethoxyethoxypropoxysilane, and butylmonomethoxymonoethoxymonobutoxysilane; phenylsilane compounds such as phenyltrimethoxysilane, phenyltriethoxysilane, phenyltripropoxysilane, phenyltripentyloxysilane, phenyltriphenyloxysilane, phenylmonomethoxydiethoxysilane, phenylmonomethoxydipropoxysilane, phenylmonomethoxydipentyloxysilane, phenylmonomethoxydiphenyloxysilane, phenylmethoxyethoxypropoxysilane, and phenylmonomethoxymonoethoxymonobutoxysilane; hydroxyphenylsilane compounds such as hydroxyphenyltrimethoxysilane, hydroxyphenyltriethoxysilane, hydroxyphenyltripropoxysilane, hydroxyphenyltripentyloxysilane, hydroxyphenyltriphenyloxysilane, hydroxyphenylmonomethoxydiethoxysilane, hydroxyphenylmonomethoxydipropoxysilane, hydroxyphenylmonomethoxydipentyloxysilane, hydroxyphenylmonomethoxydiphenyloxysilane, hydroxyphenylmethoxyethoxypropoxysilane, and hydroxyphenylmonomethoxymonoethoxymonobutoxysilane; naphthylsilane compounds such as naphthyltrimethoxysilane, naphthyltriethoxysilane, naphthyltripropoxysilane, naphthyltripentyloxysilane, naphthyltriphenyloxysilane, naphthylmonomethoxydiethoxysilane, naphthylmonomethoxydipropoxysilane, naphthylmonomethoxydipentyloxysilane, naphthylmonomethoxydiphenyloxysilane, naphthylmethoxyethoxypropoxysilane, and naphthylmonomethoxymonoethoxymonobutoxysilane; benzylsilane compounds such as benzyltrimethoxysilane, benzyltriethoxysilane, benzyltripropoxysilane, benzyltripentyloxysilane, benzyltriphenyloxysilane, benzylmonomethoxydiethoxysilane, benzylmonomethoxydipropoxysilane, benzylmonomethoxydipentyloxysilane, benzylmonomethoxydiphenyloxysilane, benzylmethoxyethoxypropoxysilane, and benzylmonomethoxymonoethoxymonobutoxysilane; hydroxybenzylsilane compounds such as hydroxybenzyltrimethoxysilane, hydroxybenzyltriethoxysilane, hydroxybenzyltripropoxysilane, hydroxybenzyltripentyloxysilane, hydroxybenzyltriphenyloxysilane, hydroxybenzylmonomethoxydiethoxysilane, hydroxybenzylmonomethoxydipropoxysilane, hydroxybenzylmonomethoxydipentyloxysilane, hydroxybenzylmonomethoxydiphenyloxysilane, hydroxybenzylmethoxyethoxypropoxysilane, and hydroxybenzylmonomethoxymonoethoxymonobutoxysilane; vinylsilane compounds such as vinyltrimethoxysilane, vinyltriethoxysilane, vinyltripropoxysilane, vinyltripentyloxysilane, vinyltriphenyloxysilane, vinylmonomethoxydiethoxysilane, vinylmonomethoxydipropoxysilane, vinylmonomethoxydipentyloxysilane, vinylmonomethoxydiphenyloxysilane, vinylmethoxyethoxypropoxysilane, and vinylmonomethoxymonoethoxymonobutoxysilane; and allylsilane compounds such as allyltrimethoxysilane, allyltriethoxysilane, allyltripropoxysilane, allyltripentyloxysilane, allyltriphenyloxysilane, allylmonomethoxydiethoxysilane, allylmonomethoxydipropoxysilane, allylmonomethoxydipentyloxysilane, allylmonomethoxydiphenyloxysilane, allylmethoxyethoxypropoxysilane, and allylmonomethoxymonoethoxymonobutoxysilane.

Compounds obtained by substituting a methyl group, an ethyl group, a propyl group, a butyl group, a hydroxyphenyl group, a naphthyl group, a benzyl group, a hydroxybenzyl group, a vinyl group, or an allyl group in the above compounds with a group represented by the above formula (1) are also preferable as the silane compound (ii).

Specific examples of the silane compound (iii) include hydrosilane compounds such as dimethoxysilane, diethoxysilane, dipropoxysilane, dipentyloxysilane, diphenyloxysilane, methoxyethoxysilane, methoxypropoxysilane, methoxypentyloxysilane, methoxyphenyloxysilane, ethoxypropoxysilane, ethoxypentyloxysilane, and ethoxyphenyloxysilane; methylhydrosilane compounds such as methyldimethoxysilane, methylmethoxyethoxysilane, methyldiethoxysilane, methylmethoxypropoxysilane, methylmethoxypentyloxysilane, methylethoxypropoxysilane, methyldipropoxysilane, methyldipentyloxysilane, methyldiphenyloxysilane, and methylmethoxyphenyloxysilane; ethylhydrosilane compounds such as ethyldimethoxysilane, ethylmethoxyethoxysilane, ethyldiethoxysilane, ethylmethoxypropoxysilane, ethylmethoxypentyloxysilane, ethylethoxypropoxysilane, ethyldipropoxysilane, ethyldipentyloxysilane, ethyldiphenyloxysilane, and ethylmethoxyphenyloxysilane; propylhydrosilane compounds such as propyldimethoxysilane, propylmethoxyethoxysilane, propyldiethoxysilane, propylmethoxypropoxysilane, propylmethoxypentyloxysilane, propylethoxypropoxysilane, propyldipropoxysilane, propyldipentyloxysilane, propyldiphenyloxysilane, and propylmethoxyphenyloxysilane; butylhydrosilane compounds such as butyldimethoxysilane, butylmethoxyethoxysilane, butyldiethoxysilane, butylmethoxypropoxysilane, butylmethoxypentyloxysilane, butylethoxypropoxysilane, butyldipropoxysilane, butyldipentyloxysilane, butyldiphenyloxysilane, and butylmethoxyphenyloxysilane; phenylhydrosilane compounds such as phenyldimethoxysilane, phenylmethoxyethoxysilane, phenyldiethoxysilane, phenylmethoxypropoxysilane, phenylmethoxypentyloxysilane, phenylethoxypropoxysilane, phenyldipropoxysilane, phenyldipentyloxysilane, phenyldiphenyloxysilane, and phenylmethoxyphenyloxysilane; hydroxyphenylhydrosilane compounds such as hydroxyphenyldimethoxysilane, hydroxyphenylmethoxyethoxysilane, hydroxyphenyldiethoxysilane, hydroxyphenylmethoxypropoxysilane, hydroxyphenylmethoxypentyloxysilane, hydroxyphenylethoxypropoxysilane, hydroxyphenyldipropoxysilane, hydroxyphenyldipentyloxysilane, hydroxyphenyldiphenyloxysilane, and hydroxyphenylmethoxyphenyloxysilane; naphthylhydrosilane compounds such as naphthyldimethoxysilane, naphthylmethoxyethoxysilane, naphthyldiethoxysilane, naphthylmethoxypropoxysilane, naphthylmethoxypentyloxysilane, naphthylethoxypropoxysilane, naphthyldipropoxysilane, naphthyldipentyloxysilane, naphthyldiphenyloxysilane, and naphthylmethoxyphenyloxysilane; benzylhydrosilane compounds such as benzyldimethoxysilane, benzylmethoxyethoxysilane, benzyldiethoxysilane, benzylmethoxypropoxysilane, benzylmethoxypentyloxysilane, benzylethoxypropoxysilane, benzyldipropoxysilane, benzyldipentyloxysilane, benzyldiphenyloxysilane, and benzylmethoxyphenyloxysilane; hydroxybenzylhydrosilane compounds such as hydroxybenzyldimethoxysilane, hydroxybenzylmethoxyethoxysilane, hydroxybenzyldiethoxysilane, hydroxybenzylmethoxypropoxysilane, hydroxybenzylmethoxypentyloxysilane, hydroxybenzylethoxypropoxysilane, hydroxybenzyldipropoxysilane, hydroxybenzyldipentyloxysilane, hydroxybenzyldiphenyloxysilane, and hydroxybenzylmethoxyphenyloxysilane; dimethylsilane compounds such as dimethyldimethoxysilane, dimethylmethoxyethoxysilane, dimethylmethoxypropoxysilane, dimethyldiethoxysilane, dimethyldipentyloxysilane, dimethyldiphenyloxysilane, dimethylethoxypropoxysilane, and dimethyldipropoxysilane; diethylsilane compounds such as diethyldimethoxysilane, diethylmethoxyethoxysilane, diethylmethoxypropoxysilane, diethyldiethoxysilane, diethyldipentyloxysilane, diethyldiphenyloxysilane, diethylethoxypropoxysilane, and diethyldipropoxysilane; dipropylsilane compounds such as dipropyldimethoxysilane, dipropylmethoxyethoxysilane, dipropylmethoxypropoxysilane, dipropyldiethoxysilane, dipropyldipentyloxysilane, dipropyldiphenyloxysilane, dipropylethoxypropoxysilane, and dipropyldipropoxysilane; dibutylsilane compounds such as dibutyldimethoxysilane, dibutylmethoxyethoxysilane, dibutylmethoxypropoxysilane, dibutyldiethoxysilane, dibutyldipentyloxysilane, dibutyldiphenyloxysilane, dibutylethoxypropoxysilane, and dibutyldipropoxysilane; diphenylsilane compounds such as diphenyldimethoxysilane, diphenylmethoxyethoxysilane, diphenylmethoxypropoxysilane, diphenyldiethoxysilane, diphenyldipentyloxysilane, diphenyldiphenyloxysilane, diphenylethoxypropoxysilane, and diphenyldipropoxysilane; di(hydroxyphenyl)silane compounds such as di(hydroxyphenyl)dimethoxysilane, di(hydroxyphenyl)methoxyethoxysilane, di(hydroxyphenyl)methoxypropoxysilane, di(hydroxyphenyl)diethoxysilane, di(hydroxyphenyl)dipentyloxysilane, di(hydroxyphenyl)diphenyloxysilane, di(hydroxyphenyl)ethoxypropoxysilane, and di(hydroxyphenyl)dipropoxysilane; dinaphthylsilane compounds such as dinaphthyldimethoxysilane, dinaphthylmethoxyethoxysilane, dinaphthylmethoxypropoxysilane, dinaphthyldiethoxysilane, dinaphthyldipentyloxysilane, dinaphthyldiphenyloxysilane, dinaphthylethoxypropoxysilane, and dinaphthyldipropoxysilane; dibenzylsilane compounds such as dibenzyldimethoxysilane, dibenzylmethoxyethoxysilane, dibenzylmethoxypropoxysilane, dibenzyldiethoxysilane, dibenzyldipentyloxysilane, dibenzyldiphenyloxysilane, dibenzylethoxypropoxysilane, and dibenzyldipropoxysilane; di(hydroxybenzyl)silane compounds such as di(hydroxybenzyl)dimethoxysilane, di(hydroxybenzyl)methoxyethoxysilane, di(hydroxybenzyl)methoxypropoxysilane, di(hydroxybenzyl)diethoxysilane, di(hydroxybenzyl)dipentyloxysilane, di(hydroxybenzyl)diphenyloxysilane, di(hydroxybenzyl)ethoxypropoxysilane, and di(hydroxybenzyl)dipropoxysilane; methylethylsilane compounds such as methylethyldimethoxysilane, methylethylmethoxyethoxysilane, methylethylmethoxypropoxysilane, methylethyldiethoxysilane, methylethyldipentyloxysilane, methylethyldiphenyloxysilane, methylethylethoxypropoxysilane, and methylethyldipropoxysilane; methylpropylsilane compounds such as methylpropyldimethoxysilane, methylpropylmethoxyethoxysilane, methylpropylmethoxypropoxysilane, methylpropyldiethoxysilane, methylpropyldipentyloxysilane, methylpropyldiphenyloxysilane, methylpropylethoxypropoxysilane, and methylpropyldipropoxysilane; methylbutylsilane compounds such as methylbutyldimethoxysilane, methylbutylmethoxyethoxysilane, methylbutylmethoxypropoxysilane, methylbutyldiethoxysilane, methylbutyldipentyloxysilane, methylbutyldiphenyloxysilane, methylbutylethoxypropoxysilane, and methylbutyldipropoxysilane; methyl(phenyl)silane compounds such as methyl(phenyl)dimethoxysilane, methyl(phenyl)methoxyethoxysilane, methyl(phenyl)methoxypropoxysilane, methyl(phenyl)diethoxysilane, methyl(phenyl)dipentyloxysilane, methyl(phenyl)diphenyloxysilane, methyl(phenyl)ethoxypropoxysilane, and methyl(phenyl)dipropoxysilane; methyl(hydroxyphenyl)silane compounds such as methyl(hydroxyphenyl)dimethoxysilane, methyl(hydroxyphenyl)methoxyethoxysilane, methyl(hydroxyphenyl)methoxypropoxysilane, methyl(hydroxyphenyl)diethoxysilane, methyl(hydroxyphenyl)dipentyloxysilane, methyl(hydroxyphenyl)diphenyloxysilane, methyl(hydroxyphenyl)ethoxypropoxysilane, and methyl(hydroxyphenyl)dipropoxysilane; methyl(naphthyl)silane compounds such as methyl(naphthyl)dimethoxysilane, methyl(naphthyl)methoxyethoxysilane, methyl(naphthyl)methoxypropoxysilane, methyl(naphthyl)diethoxysilane, methyl(naphthyl)dipentyloxysilane, methyl(naphthyl)diphenyloxysilane, methyl(naphthyl)ethoxypropoxysilane, and methyl(naphthyl)dipropoxysilane; methyl(benzyl)silane compounds such as methyl(benzyl)dimethoxysilane, methyl(benzyl)methoxyethoxysilane, methyl(benzyl)methoxypropoxysilane, methyl(benzyl)diethoxysilane, methyl(benzyl)dipentyloxysilane, methyl(benzyl)diphenyloxysilane, methyl(benzyl)ethoxypropoxysilane, and methyl(benzyl)dipropoxysilane; methyl(hydroxybenzyl)silane compounds such as methyl(hydroxybenzyl)dimethoxysilane, methyl(hydroxybenzyl)methoxyethoxysilane, methyl(hydroxybenzyl)methoxypropoxysilane, methyl(hydroxybenzyl)diethoxysilane, methyl(hydroxybenzyl)dipentyloxysilane, methyl(hydroxybenzyl)diphenyloxysilane, methyl(hydroxybenzyl)ethoxypropoxysilane, and methyl(hydroxybenzyl)dipropoxysilane; ethylpropylsilane compounds such as ethylpropyldimethoxysilane, ethylpropylmethoxyethoxysilane, ethylpropylmethoxypropoxysilane, ethylpropyldiethoxysilane, ethylpropyldipentyloxysilane, ethylpropyldiphenyloxysilane, ethylpropylethoxypropoxysilane, and ethylpropyldipropoxysilane; ethylbutylsilane compounds such as ethylbutyldimethoxysilane, ethylbutylmethoxyethoxysilane, ethylbutylmethoxypropoxysilane, ethylbutyldiethoxysilane, ethylbutyldipentyloxysilane, ethylbutyldiphenyloxysilane, ethylbutylethoxypropoxysilane, and ethylbutyldipropoxysilane; ethyl(phenyl)silane compounds such as ethyl(phenyl)dimethoxysilane, ethyl(phenyl)methoxyethoxysilane, ethyl(phenyl)methoxypropoxysilane, ethyl(phenyl)diethoxysilane, ethyl(phenyl)dipentyloxysilane, ethyl(phenyl)diphenyloxysilane, ethyl(phenyl)ethoxypropoxysilane, and ethyl(phenyl)dipropoxysilane; ethyl(hydroxyphenyl)silane compounds such as ethyl(hydroxyphenyl)dimethoxysilane, ethyl(hydroxyphenyl)methoxyethoxysilane, ethyl(hydroxyphenyl)methoxypropoxysilane, ethyl(hydroxyphenyl)diethoxysilane, ethyl(hydroxyphenyl)dipentyloxysilane, ethyl(hydroxyphenyl)diphenyloxysilane, ethyl(hydroxyphenyl)ethoxypropoxysilane, and ethyl(hydroxyphenyl)dipropoxysilane; ethyl(naphthyl)silane compounds such as ethyl(naphthyl)dimethoxysilane, ethyl(naphthyl)methoxyethoxysilane, ethyl(naphthyl)methoxypropoxysilane, ethyl(naphthyl)diethoxysilane, ethyl(naphthyl)dipentyloxysilane, ethyl(naphthyl)diphenyloxysilane, ethyl(naphthyl)ethoxypropoxysilane, and ethyl(naphthyl)dipropoxysilane; ethyl(benzyl)silane compounds such as ethyl(benzyl)dimethoxysilane, ethyl(benzyl)methoxyethoxysilane, ethyl(benzyl)methoxypropoxysilane, ethyl(benzyl)diethoxysilane, ethyl(benzyl)dipentyloxysilane, ethyl(benzyl)diphenyloxysilane, ethyl(benzyl)ethoxypropoxysilane, and ethyl(benzyl)dipropoxysilane; ethyl(hydroxybenzyl)silane compounds such as ethyl(hydroxybenzyl)dimethoxysilane, ethyl(hydroxybenzyl)methoxyethoxysilane, ethyl(hydroxybenzyl)methoxypropoxysilane, ethyl(hydroxybenzyl)diethoxysilane, ethyl(hydroxybenzyl)dipentyloxysilane, ethyl(hydroxybenzyl)diphenyloxysilane, ethyl(hydroxybenzyl)ethoxypropoxysilane, and ethyl(hydroxybenzyl)dipropoxysilane; propylbutylsilane compounds such as propylbutyldimethoxysilane, propylbutylmethoxyethoxysilane, propylbutylmethoxypropoxysilane, propylbutyldiethoxysilane, propylbutyldipentyloxysilane, propylbutyldiphenyloxysilane, propylbutylethoxypropoxysilane, and propylbutyldipropoxysilane; propyl(phenyl)silane compounds such as propyl(phenyl)dimethoxysilane, propyl(phenyl)methoxyethoxysilane, propyl(phenyl)methoxypropoxysilane, propyl(phenyl)diethoxysilane, propyl(phenyl)dipentyloxysilane, propyl(phenyl)diphenyloxysilane, propyl(phenyl)ethoxypropoxysilane, and propyl(phenyl)dipropoxysilane; propyl(hydroxyphenyl)silane compounds such as propyl(hydroxyphenyl)dimethoxysilane, propyl(hydroxyphenyl)methoxyethoxysilane, propyl(hydroxyphenyl)methoxypropoxysilane, propyl(hydroxyphenyl)diethoxysilane, propyl(hydroxyphenyl)dipentyloxysilane, propyl(hydroxyphenyl)diphenyloxysilane, propyl(hydroxyphenyl)ethoxypropoxysilane, and propyl(hydroxyphenyl)dipropoxysilane; propyl(naphthyl)silane compounds such as propyl(naphthyl)dimethoxysilane, propyl(naphthyl)methoxyethoxysilane, propyl(naphthyl)methoxypropoxysilane, propyl(naphthyl)diethoxysilane, propyl(naphthyl)dipentyloxysilane, propyl(naphthyl)diphenyloxysilane, propyl(naphthyl)ethoxypropoxysilane, and propyl(naphthyl)dipropoxysilane; propyl(benzyl)silane compounds such as propyl(benzyl)dimethoxysilane, propyl(benzyl)methoxyethoxysilane, propyl(benzyl)methoxypropoxysilane, propyl(benzyl)diethoxysilane, propyl(benzyl)dipentyloxysilane, propyl(benzyl)diphenyloxysilane, propyl(benzyl)ethoxypropoxysilane, and propyl(benzyl)dipropoxysilane; propyl(hydroxybenzyl)silane compounds such as propyl(hydroxybenzyl)dimethoxysilane, propyl(hydroxybenzyl)methoxyethoxysilane, propyl(hydroxybenzyl)methoxypropoxysilane, propyl(hydroxybenzyl)diethoxysilane, propyl(hydroxybenzyl)dipentyloxysilane, propyl(hydroxybenzyl)diphenyloxysilane, propyl(hydroxybenzyl)ethoxypropoxysilane, and propyl(hydroxybenzyl)dipropoxysilane; divinylsilane compounds such as divinyldimethoxysilane, divinylmethoxyethoxysilane, divinylmethoxypropoxysilane, divinyldiethoxysilane, divinyldipentyloxysilane, divinyldiphenyloxysilane, divinylethoxypropoxysilane, and divinyldipropoxysilane; vinylmethylsilane compounds such as vinylmethyldimethoxysilane, vinylmethylmethoxyethoxysilane, vinylmethylmethoxypropoxysilane, vinylmethyldiethoxysilane, vinylmethyldipentyloxysilane, vinylmethyldiphenyloxysilane, vinylmethylethoxypropoxysilane, and vinylmethyldipropoxysilane; vinylethylsilane compounds such as vinylethyldimethoxysilane, vinylethylmethoxyethoxysilane, vinylethylmethoxypropoxysilane, vinylethyldiethoxysilane, vinylethyldipentyloxysilane, vinylmethyldiphenyloxysilane, vinylethylethoxypropoxysilane, and vinylethyldipropoxysilane; vinyl(phenyl)silane compounds such as vinyl(phenyl)dimethoxysilane, vinyl(phenyl)methoxyethoxysilane, vinyl(phenyl)methoxypropoxysilane, vinyl(phenyl)diethoxysilane, vinyl(phenyl)dipentyloxysilane, vinyl(phenyl)diphenyloxysilane, vinyl(phenyl)ethoxypropoxysilane, and vinyl(phenyl)dipropoxysilane; diallylsilane compounds such as diallyldimethoxysilane, diallylmethoxyethoxysilane, diallylmethoxypropoxysilane, diallyldiethoxysilane, diallyldipentyloxysilane, diallyldiphenyloxysilane, diallylethoxypropoxysilane, and diallyldipropoxysilane; allylmethylsilane compounds such as allylmethyldimethoxysilane, allylmethylmethoxyethoxysilane, allylmethylmethoxypropoxysilane, allylmethyldiethoxysilane, allylmethyldipentyloxysilane, allylmethyldiphenyloxysilane, allylmethylethoxypropoxysilane, and allylmethyldipropoxysilane; allylethylsilane compounds such as allylethyldimethoxysilane, allylethylmethoxyethoxysilane, allylethylmethoxypropoxysilane, allylethyldiethoxysilane, allylethyldipentyloxysilane, allylmethyldiphenyloxysilane, allylethylethoxypropoxysilane, and allylethyldipropoxysilane; and allyl(phenyl)silane compounds such as allyl(phenyl)dimethoxysilane, allyl(phenyl)methoxyethoxysilane, allyl(phenyl)methoxypropoxysilane, allyl(phenyl)diethoxysilane, allyl(phenyl)dipentyloxysilane, allyl(phenyl)diphenyloxysilane, allyl(phenyl)ethoxypropoxysilane, and allyl(phenyl)dipropoxysilane.

Compounds obtained by substituting at least one of methyl groups, ethyl groups, propyl groups, butyl groups, hydroxyphenyl groups, naphthyl groups, benzyl groups, hydroxybenzyl groups, vinyl groups, and allyl groups in the above compounds with a group represented by the above formula (1) are also preferable as the silane compound (iii).

By subjecting a silane compound described above to hydrolytic condensation by a conventional procedure, the poly-siloxane chain or oligo-siloxane chain is formed.

As the poly-siloxane chain or oligo-siloxane chain, a siloxane chain including a unit represented by the following formula (A3-1) and/or a unit represented by the following formula (A4-1) is preferable, and a linear siloxane chain including a unit represented by the formula (A4-1) is more preferable:

$$—(SiR^{A13}O_{3/2})—\qquad(A3\text{-}1)$$

$$—(SiR^{A14}R^{A15}O_{2/2})—\qquad(A4\text{-}1)$$

In the formula (A3-1) and the formula (A4-1), $R^{A13}$, $R^{A14}$, and $R^{A15}$ are each independently a group represented by the above formula (1), a linear or branched alkyl group having 1 or more and 4 or less carbon atoms, or a phenyl group.

<Poly-Silane Chain or Oligo-Silane Chain>

The structure of poly-silane chain or oligo-silane chain in a silicon-containing polymer is not particularly limited, so long as the silicon-containing polymer has a group represented by the above formula (1). The poly-silane chain or oligo-silane chain may include a silanol group and/or an alkoxy group. The poly-silane chain or oligo-silane chain is preferably formed from, for example, at least one of units represented by the following formulae (A5) to (A9):

[Chem. 3]

(A5)

(A6)

(A7)

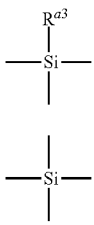

(A8)

(A9)

(In the formulae (A5), (A7), and (A8), $R^{a3}$ and $R^{a4}$ each represent a hydrogen atom, an organic group, or a silyl group. $R^{a5}$ represents a hydrogen atom or an alkyl group. When $R^{a5}$ is an alkyl group, an alkyl group having 1 or more and 4 or less carbon atoms is preferable, a methyl group and an ethyl group are more preferable.).

As the organic group as $R_{a3}$ and $R^{a4}$, a carbon atom-containing group is preferable, and a group including one or more carbon atoms and one or more atoms selected from the group consisting of H, O, S, Se, N, B, P, and halogen atoms is more preferable. Examples of the organic groups as $R^{a3}$ and $R^{a4}$ include a group represented by the above-described formula (1), hydrocarbon groups such as an alkyl group, an alkenyl group, a cycloalkyl group, a cycloalkenyl group, an aryl group, and an aralkyl group, an alkoxy group, an alkenyloxy group, a cycloalkoxy group, a cycloalkenyloxy group, an aryloxy group, and an aralkyloxy group, and the like. Among these groups, a group represented by the above-described formula (1), an alkyl group, an aryl group, and an aralkyl group are preferable. Suitable examples of the alkyl group, aryl group and aralkyl group are the same as in the case where R is an alkyl group, an aryl group, or an aralkyl group in the above-described formula (A1).

When $R^{a3}$ and $R^{a4}$ are each a silyl group, examples of the silyl group include a silyl group and $Si_{1-10}$ silanyl groups (such as $Si_{1-6}$ silanyl groups) such as a disilanyl group and a trisilanyl group. The poly-silane chain or oligo-silane chain preferably includes units of the following formulae (A10) to (A13).

[Chem. 4]

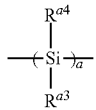
(A10)

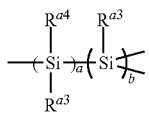
(A11)

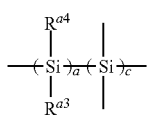
(A12)

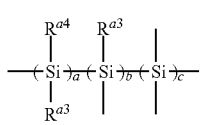
(A13)

In (A10) to (A13), $R^{a3}$ and $R^{a4}$ are the same as $R^{a3}$ and $R^{a4}$ in the formulae (A5), (A7), and (A8). Each of a, b, and c is an integer of 2 or more and 1000 or less. Each of a, b, and c is preferably 3 or more and 500 or less, more preferably 10 or more and 500 or less, and most preferably 10 or more and 100 or less. The building block in each unit may be present in the unit either in a random manner or in a blocked state.

Among the poly-silane chain or oligo-silane chains described above, poly-silane chain or oligo-silane chain including a combination of a group represented by the formula (1), an alkyl group, and an aryl group or an aralkyl group, each bound to a silicon atom, and poly-silane chain or oligo-silane chain including a combination of a group represented by the formula (1) and an alkyl group, each bound to a silicon atom, are preferable.

More specifically, poly-silane chain or oligo-silane chain including a combination of a group represented by the formula (1), a methyl group, and a benzyl group each bound to a silicon atom, poly-silane chain or oligo-silane chain including a combination of a group represented by the formula (1), a methyl group, and a phenyl group, each bound to a silicon atom, poly-silane chain or oligo-silane chain including a combination of a group represented by the formula (1) and a methyl group, each bound to a silicon atom, and poly-silane chain or oligo-silane chain including only groups represented by the formula (1), each bound to a silicon atom, are preferably used.

<Group Represented by Formula (1)>

The silicon-containing polymer has a group represented by the formula (1) and thus is soluble in an alkaline solution or becomes soluble in an aqueous alkaline solution by heating or other means.

The number of moles of a group represented by the formula (1) in the silicon-containing polymer is preferably 0.05 mol or more and 2.0 mol or less and more preferably 0.2 mol or more and 1.0 mol or less with respect to 1.0 mol of silicon atom in the silicon-containing polymer because the silicon-containing polymer is excellent in solubility in an alkaline solution or easily becomes soluble in an aqueous alkaline solution by heating or other means.

The hydrocarbon groups as $R^1$ and $R^2$ in the above formula (1) are not particularly limited, so long as the number of carbon atoms is 1 or more and 10 or less. The hydrocarbon group as $R^1$ may be an aliphatic hydrocarbon group, an aromatic hydrocarbon group, or a combination of an aliphatic hydrocarbon group and an aromatic hydrocarbon group.

In cases where the hydrocarbon groups as $R^1$ and $R^2$ are an aliphatic hydrocarbon group and the hydrocarbon groups as $R^1$ and $R^2$ include an aliphatic hydrocarbon group, the aliphatic hydrocarbon group may be linear or branched or include a cyclic skeleton. From the viewpoint that raw materials are easily acquired and the viewpoint that the alkali-solubility of a silicon-containing polymer is particularly favorable, the hydrocarbon groups as $R^1$ and $R^2$ are preferably a linear or branched hydrocarbon group, and more preferably a linear hydrocarbon group.

Because it is easy to acquire raw materials and synthesize a silicon-containing polymer, n is preferably 1. That is, $R^2$ is preferably a divalent hydrocarbon group.

Specific examples of the hydrocarbon groups as $R^1$ and $R^2$ include a methylene group, an ethane-1,2-diyl group, an ethane-1,1-diyl group, a propane-1,3-diyl group, a propane-1,2-diyl group, a propane-1,1-diyl group, a butane-1,4-diyl group, a pentane-1,5-diyl group, a hexane-1,6-diyl group, a heptane-1,7-diyl group, an octane-1,8-diyl group, a nonane- 1,9-diyl group, a decane-1,10-diyl group, a cyclohexane-1,4-diyl group, a cyclohexane-1,3-diyl group, a cyclohexane-1,2-diyl group, a p-phenylene group, a m-phenylene group, an o-phenylene group, a naphthalene-2,6-diyl group, a naphthalene-2,7-diyl group, and a naphthalene-1,4-diyl group, and the like.

Among the above hydrocarbon groups as $R^1$ and $R^2$, a methylene group, an ethane-1,2-diyl group, a propane-1,3-diyl group, a p-phenylene group, and a m-phenylene group are preferable, and a methylene group, an ethane-1,2-diyl group, and a propane-1,3-diyl group are more preferable.

As the group represented by the formula (1), groups represented by the following formulae (1a) to (1g) are preferable:

—CH$_2$—S—CH$_2$CH$_2$—CO—O—R$^3$ (1a)

—CH$_2$CH$_2$—S—CH$_2$CH$_2$—CO—O—R$^3$ (1b)

—CH$_2$CH$_2$CH$_2$—S—CH$_2$CH$_2$—CO—O—R$^3$ (1c)

—CH$_2$CH$_2$—S—CH$_2$CH$_2$CH$_2$—CO—O—R$^3$ (1d)

—CH$_2$CH$_2$CH$_2$—S—CH$_2$CH$_2$CH$_2$—CO—O—R$^3$ (1e)

—CH$_2$CH$_2$—S—CH$_2$—CO—O—R$^3$ (1f)

—CH$_2$CH$_2$CH$_2$—S—CH$_2$—CO—O—R$^3$ (1g).

$R^3$ is a hydrogen atom or an organic group having 1 or more and 20 or less carbon atoms and being bound to the oxygen atom via a C—O bond. $R^3$ is preferably a hydrogen atom from the viewpoint of solubility of the silicon-containing polymer in an alkaline solution. Examples of the organic group as $R^3$ include a hydrocarbon group, a halogenated hydrocarbon group, an alkoxyalkyl group, a heteroaryl group and the like. Among these, a hydrocarbon group is preferable.

Suitable examples of the hydrocarbon group include an alkyl group, an alkenyl group, a cycloalkyl group, an aralkyl group, and an aryl group. Specific examples of the alkyl group include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, an n-nonyl group, an n-decyl group, a n-undecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and an icosyl group. Specific examples of the alkenyl group include a vinyl group, an allyl group, a 3-butenyl group, a 4-pentenyl group, a 5-hexenyl group, a 6-heptenyl group, a 7-octenyl group, an 8-nonenyl group, and a 9-dodecenyl group. Specific examples of the cycloalkyl group include a cyclopropyl group, a cyclobutyl group, a cyclopentyl group, a cyclohexyl group, a cycloheptyl group, a cyclooctyl group, a cyclononyl group, a cyclodecyl group, and the like. Specific examples of the aralkyl group include a benzyl group, a phenethyl group, a naphthalen-2-ylmethyl group, and a naphthalen-1-ylmethyl group. Specific examples of the aryl group include a phenyl group, a naphthalen-1-yl group, a naphthalen-2-yl group, a 4-phenylphenyl group, a 3-phenylphenyl group, a 2-phenylphenyl group and the like.

When $R^3$ is a hydrogen atom, an alkali-developable negative-type photosensitive composition can be obtained by combining the silicon-containing polymer as an alkali-soluble resin with a photopolymerizable compound such as various (meth)acrylate compounds and a known photopolymerization initiator. When the organic group as $R^3$ is an acid-dissociable dissolution-inhibiting group, an alkali-developable positive-type photosensitive composition can be obtained by combining the silicon containing polymer with a known photoacid generator. When using a photosensitive composition containing such a silicon-containing polymer, it is possible to form a silicon-containing polymer-containing film patterned by a photolithography method. The silicon-containing polymer-containing film that is patterned is not limited to particular applications. For example, a silica-based coating patterned can be formed by baking a silicon-containing polymer-containing film patterned.

The acid-dissociable dissolution-inhibiting group is preferably a group represented by the following formula (a1), a group represented by the following formula (a2), a hydrocarbon group having a tertiary carbon atom and a bonding on the tertiary carbon atom to bond with the oxygen atom in the formula (1), a vinyloxyethyl group, a tetrahydropyranyl group, a tetrahydrofuranyl group, and a trialkylsilyl group.

[Chem. 5]

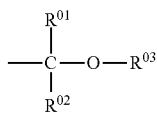  (a1)

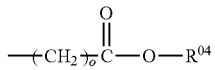  (a2)

In the above formula (a1), $R^{o1}$ and $R^{o2}$ are each independently a hydrogen atom or a linear or branched alkyl group having 1 or more and 6 or less carbon atoms. $R^{o3}$ is a linear, branched, or cyclic alkyl group having 1 or more and 18 or less carbon atoms. However, the sum of the number of carbon atoms of $R^{o1}$, the number of carbon atoms of $R^{o2}$, and the number of carbon atoms of $R^{o3}$ is 0 or more and 20 or less. In the above formula (a2), $R^{o4}$ is a linear, branched, or cyclic alkyl group having 1 or more and 6 or less carbon atoms, and o is 0 or 1.

The above linear or branched alkyl group includes a methyl group, an ethyl group, a propyl group, an isopropyl group, a n-butyl group, an isobutyl group, a tert-butyl group, a pentyl group, an isopentyl group, a neopentyl group, etc. The cyclic alkyl group includes a cyclopentyl group, a cyclohexyl group, etc.

Examples of the acid-dissociable dissolution-inhibiting group represented by the formula (a1) include a 1-methoxyethyl group, a 1-ethoxyethyl group, a 1-n-propoxyethyl group, a 1 isopropoxyethyl group, a 1-n-butoxyethyl group, a 1-isobutoxyethyl group, a 1-tert-butoxyethyl group, a 1 cyclohexyloxyethyl group, a 1-methoxypropyl group, a 1-ethoxypropyl group, a 1-methoxy-1-methyl-ethyl group, a 1-ethoxy-1-methylethyl group, and the like.

The acid-dissociable dissolution-inhibiting group represented by the formula (a2) specifically includes a tert-butoxycarbonyl group, a tert-butoxycarbonylmethyl group, and the like.

The hydrocarbon group having a tertiary carbon atom and a bonding on the tertiary carbon atom to bond to the oxygen atom in the formula (1) is a tert-butyl group, a tert-pentyl group, a 1-methylcyclopentan-1-yl group, a 1-ethylcyclopentan-1-yl group, a 1-n-propylcyclopentan-1-yl group, a 1-isopropylcyclopentan-1-yl group, a 1-n-butylcyclopentan-1-yl group, a 1-methylcyclohexan-1-yl group, a 1-ethylcyclohexan-1-yl group, a 1-n-propylcyclohexan-1-yl group, a 1-isopropylcyclohexan-1-yl group, a 1-n-butylcyclohexan-1-yl group, etc.

The trialkyl silyl group includes a trialkyl silyl group in which the number of carbon atoms of each alkyl group is 1 or more and 6 or less, such as a trimethyl silyl group, a tri-tert-butyldimethylsilyl group, etc.

The weight average molecular weight (Mw) of a silicon-containing polymer described above, and the dispersion degree (Mw/Mn), the ratio of weight average molecular weight (Mw) and number average molecular weight (Mn), are not particularly limited. The weight average molecular weight is preferably 500 or more and 12000 or less, more preferably 700 or more and 8000 or less, because the silicon-containing polymer is excellent in solubility in an alkaline solution or becomes easily soluble in an aqueous alkaline solution by heating or other means. From the viewpoint of lithography characteristics, the weight average molecular weight is preferably 700 or more and 3000 or less. The dispersion degree is preferably 1 or more and 4.5 or less, and more preferably 2 or more and 4 or less.

«Film-Forming Composition»

A film-forming composition includes the above-described silicon-containing polymer (A) and a solvent (S). By applying such a film-forming composition, a film including the silicon-containing polymer (A) as the main component can be formed. The applications of the film including the silicon-containing polymer (A) as the main component are not particularly limited. A silica-based coating can be formed, for example, by baking the film including the silicon-containing polymer (A) as the main component.

<Silicon-Containing Polymer (A)>

The silicon-containing polymer (A) is as described above. The silicon-containing polymer (A) content in the film-forming composition is not particularly limited and may be set depending on the desired film thickness. From the viewpoint of film-forming properties, the silicon-containing polymer (A) content in the film-forming composition is preferably 1% by mass or more and 50% by mass or less, more preferably 5% by mass or more and 40% by mass or less, and particularly preferably 10% by mass or more and 35% by mass or less.

<Curing Agent (B)>

The film-forming composition may include a curing agent (B). When the film-forming composition includes a curing agent (B), it is easy to form a silica-based coating that has a low dielectric constant and excellent resistance to organic solvents, and therefore is not readily dissolved, swollen, or deformed by the action of an organic solvent such as N-methyl-2-pyrrolidone.

Suitable examples of the curing agent (B) include Bronsted acids such as hydrochloric acid, sulfuric acid, nitric acid, benzenesulfonic acid, and p-toluenesulfonic acid; imidazoles such as 2-methylimidazole and 2-ethyl-4-methylimidazole; organic amines such as 2,4,6-tris(dimethylaminomethyl)phenol, benzylmethylamine, DBU (1,8-diazabicyclo[5.4.0]-7-undecene), and DCMU (3-(3,4-dichlorophenyl)-1,1-dimethylurea); organophosphorus compounds such as tributylphosphine, triphenylphosphine, tris(p-tolyl)phosphine, tris(m-tolyl)phosphine, tris(o-tolyl) phosphine, diphenylcyclohexylphosphine, tricyclohexylphosphine, tris(dimethoxyphenyl)phosphine, ethyltriphenylphosphonium bromide, benzyltriphenylphosphonium chloride, and 1,4-bisdiphenylphosphinobutane; organophosphorus compound complexes such as triphenylphosphine triphenylborane, tetraphenylphosphonium tetra-p-tolyl borate, tetraphenylphosphonium tetraphenyl borate, tetraphenylphosphonium thiocyanate, tetraphenylphosphonium dicyanamide, and n-butyltriphenylphosphonium dicyanamide; complexes of a Lewis acid such as boron trifluoride and an organic amine (the organic amine is piperidine, for example); and amidines such as azabicycloundecene, diazabicycloundecene toluenesulfonic acid salt, and diazabicycloundecene octylic acid salt.

When the silicon-containing polymer contains a polysilane chain or an oligo-silane chain, it is preferable to use a curing agent that generates a base component by light or heat, alone or in addition to the above curing agent (B).

(Curing Agent that Generates Base Component by Heat)

As a curing agent that generates a base component by heat, any compound conventionally used as a thermal base generator can be used without particular limitation. For example, 2-benzyl-2-dimethylamino-1-(4-morpholinophenyl)-butan-1-one can be used as an effective agent that generates a base component by heat. Note that 2-benzyl-2-dimethylamino-1-(4-morpholinophenyl)-butan-1-one also generates a base by the action of light.

A compound that generates an imidazole compound by heating and an oxime ester compound can also be preferably used as the curing agent (B). The oxime ester compound decomposes under the action of light to produce a base. These compounds are described in detail in Japanese Patent No. 6462876.

The curing agent (B) in the film-forming composition may include two or more curing agents in different categories or of different types. Typically, the curing agent (B) content in the film-forming composition is preferably 0.01% by mass or more and 40% by mass or less, more preferably 0.1% by mass or more and 20% by mass or less, and particularly preferably 1% by mass or more and 10% by mass or less relative to the total mass of the composition.

<Nitroxy Compound (C)>

The film-forming composition may include a nitroxy compound (C). It is preferable that the film-forming composition include the nitroxy compound (C) because it is possible to form a silica-based coating with a lower dielectric constant. It is also preferable that the film-forming composition include the nitroxy compound (C) because the amount of residue remaining in the resulting silica-based coating (an impurity derived from the silica-based coating) may be reduced even when the baking temperature for formation of the silica-based coating is low, for example, at 250° C. or less (for example, within the range from 200° C. or more to 250° C. or less). In cases where the amount of residue remaining in the silica-based coating is low, the generation of gas derived from the residue of the silica-based coating or from a degradation product of the residue in the coating is reduced even when the silica-based coating is in a high-temperature atmosphere or in a reduced-pressure atmosphere.

The nitroxy compound (C) is not particularly limited, so long as the compound is stable as a nitroxide radical. Suitable examples of the nitroxy compound (C) include a compound including a structure represented by the following formula (c1).

[Chem. 6]

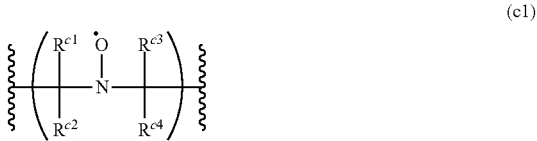

(c1)

In the formula (c1), $R^{c1}$, $R^{c2}$, $R^{c3}$, and $R^{c4}$ are each independently a hydrogen atom or an organic group having 1 or more and 10 or less carbon atoms. $R^{c1}$ and $R^{c2}$ may be bound to each other to form a ring. $R^{c3}$ and $R^{c4}$ may also be bound to each other to form a ring. When the film-forming composition includes a compound including a structure represented by the above formula (c1) as the nitroxy compound (C), a silica-based coating with a lower dielectric constant is easily formed. In the formula (c1), it is preferable that $R^{c1}$, $R^{c2}$, $R^{c3}$, and $R^{c4}$ are each independently an alkyl group or an alkyl group substituted with a heteroatom. As the alkyl group, a methyl group, an ethyl group, an n-propyl group, and an isopropyl group are preferable. Suitable examples of the heteroatom include a halogen atom, an oxygen atom, a sulfur atom, a nitrogen atom, and the like.

As suitable specific examples of the nitroxy compound (C), di-tert-butyl nitroxide, di-1,1-dimethylpropyl nitroxide, di-1,2-dimethylpropyl nitroxide, di-2,2-dimethylpropyl nitroxide, and a compound represented by the following formula (c2), (c3), or (c4) are preferable. Among these, for easily forming a silica-based coating with a lower dielectric constant, a compound represented by the following formula (c2), (c3), or (c4) is more preferable.

[Chem. 7]

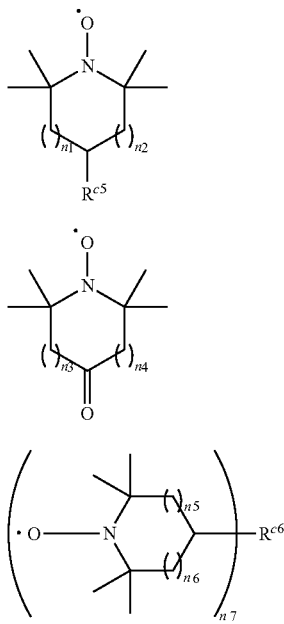

In the formulae (c2), (c3), and (c4), $R^{c5}$ represents a hydrogen atom, an alkyl group having 1 or more and 12 or less carbon atoms, a hydroxy group, an amino group, a carboxy group, a cyano group, an alkyl group substituted with a heteroatom, or a monovalent organic group bound via an ether bond, an ester bond, an amide bond, or a urethane bond. $R^{c6}$ represents a divalent or trivalent organic group.
n1 and n2 are integers that satisfy $1 \le n1+n2 \le 2$.
n3 and n4 are integers that satisfy $1 \le n3+n4 \le 2$.
n5 and n6 are integers that satisfy $1 \le n5+n6 \le 2$.
n7 is 2 or 3. As the organic group included in the monovalent organic group as $R^{c5}$ bound via an ether bond, an ester bond, an amide bond, or a urethane bond and as the divalent or trivalent organic group as $R^{c6}$, a carbon atom-containing group is preferable, and a group including one or more carbon atoms and at least one atom selected from the group consisting of H, O, S, Se, N, B, P, and halogen atoms is more preferable.

Suitable specific examples of the compound represented by the formula (c2) include the following compounds. In the following formulae, $R^{c7}$s each independently represent an optionally substituted alkyl group having 1 or more and 20 or less carbon atoms, an optionally substituted aromatic group, or an optionally substituted alicyclic group.

[Chem. 8]

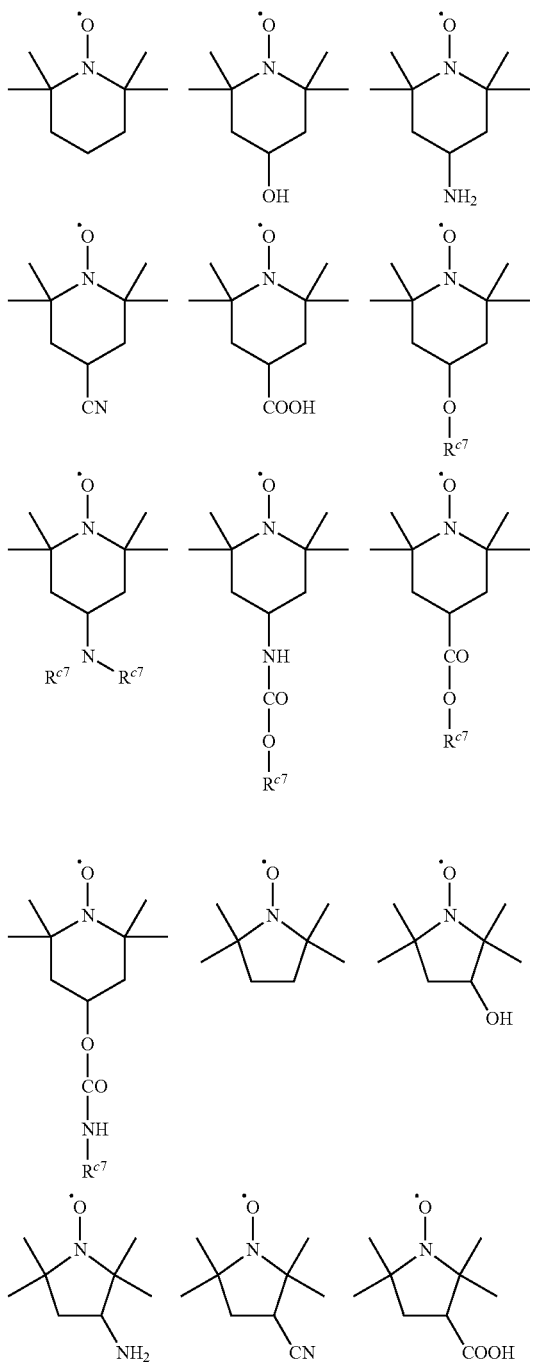

-continued
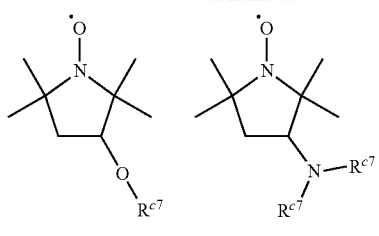
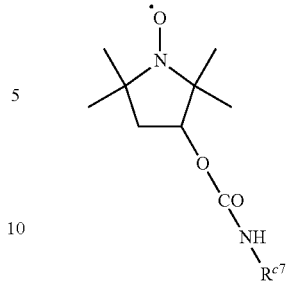
Suitable specific examples of the compound represented by the formula (c3) include the following compounds.
[Chem. 9]
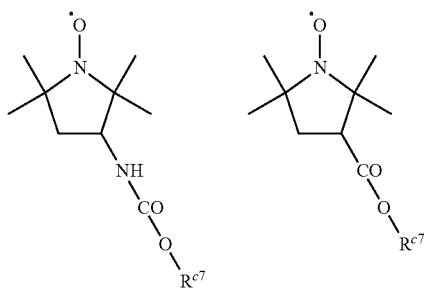
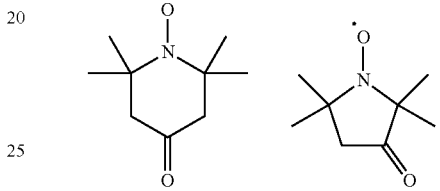
Suitable specific examples of the compound represented by the formula (c4) include the following compounds.
[Chem. 10]
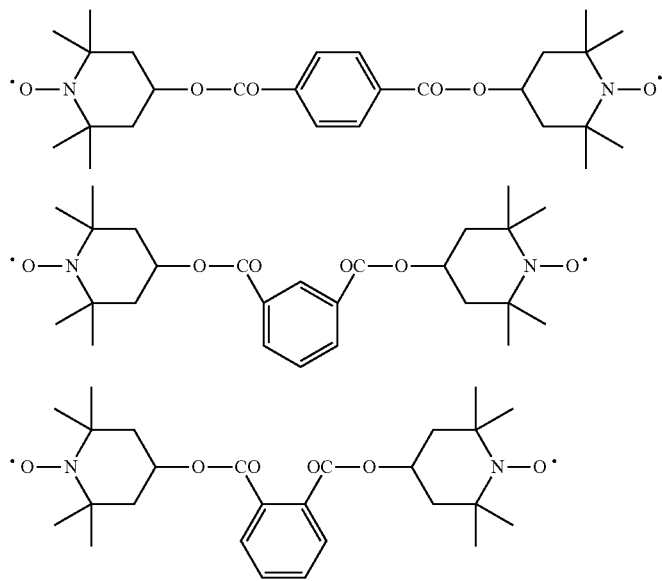
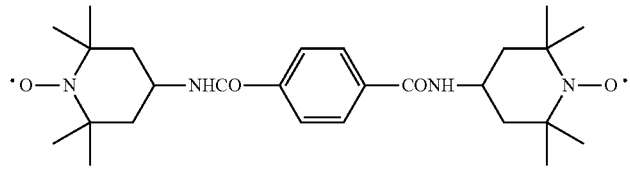

-continued

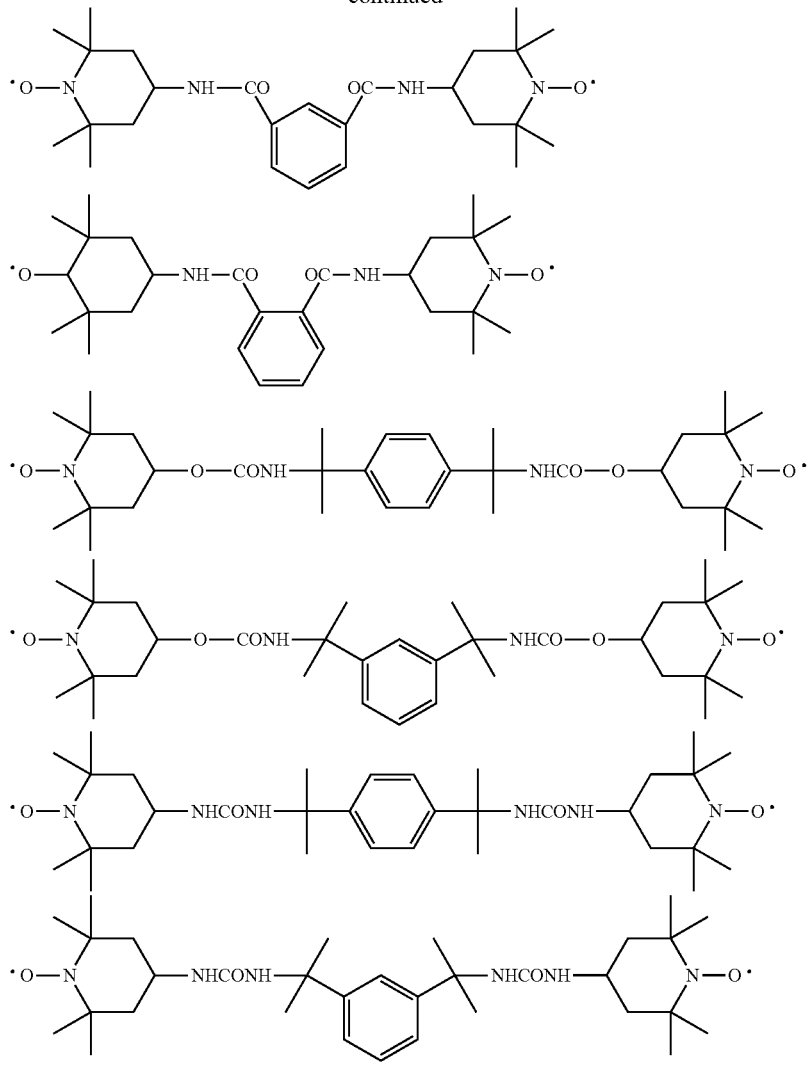

For easily forming a silica-based coating with a lower dielectric constant, further preferable examples of the nitroxy compound (C) include 2,2,6,6-tetramethylpiperidine 1-oxyl free radical, 4-hydroxy-2,2,6,6-tetramethylpiperidine 1-oxyl free radical, 4-amino-2,2,6,6-tetramethylpiperidine 1-oxyl free radical, 4-carboxy-2,2,6,6-tetramethylpiperidine 1-oxyl free radical, 4-cyano-2,2,6,6-tetramethylpiperidine 1-oxyl free radical, 4-(methacrylic acid)-2,2,6,6-tetramethylpiperidine 1-oxyl free radical, 4-(acrylic acid)-2,2,6,6-tetramethylpiperidine 1-oxyl free radical, 4-oxo-2,2,6,6-tetramethylpiperidine 1-oxyl free radical, 3-carboxy-2,2,5,5-tetramethylpyrrolidine 1-oxyl free radical, 4-acetamide-2,2,6,6-tetramethylpiperidine 1-oxyl free radical, 4-(2-chloroacetamide)-2,2,6,6-tetramethylpiperidine 1-oxyl free radical, 4-hydroxy-2,2,6,6-tetramethylpiperidine 1-oxylbenzoate free radical, 4-isothiocyanato-2,2,6,6-tetramethylpiperidine 1-oxyl free radical, 4-(2-iodoacetamide)-2,2,6,6-tetramethylpiperidine 1-oxyl free radical, and 4-methoxy-2,2,6,6-tetramethylpiperidine 1-oxyl free radical. The nitroxy compound (C) may be used alone, or two or more nitroxy compounds may be used in combination.

The nitroxy compound (C) content in the film-forming composition may be very small. For easily forming a silica-based coating with a lower dielectric constant, the nitroxy compound (C) content in the film-forming composition is preferably 0.005% by mass or more and more preferably 0.009% by mass or more relative to the total mass of all the components of the film-forming composition except for the (S) solvent. The nitroxy compound (C) content in the film-forming composition is preferably 2% by mass or less and more preferably 1% by mass or less relative to the total mass of all the components of the film-forming composition except for the solvent (S).

<Solvent (S)>

The film-forming composition includes a solvent (S). The solvent (S) is not particularly limited, so long as the silicon-containing polymer (A) is soluble in it.

Suitable examples of the solvent (S) include alcohols such as methanol, ethanol, propanol, and n-butanol; polyhydric alcohols such as ethylene glycol, diethylene glycol, propylene glycol, and dipropylene glycol;

ketones such as acetone, methyl ethyl ketone, cyclohexanone, methyl-n-amyl ketone, methyl isoamyl ketone, and 2-heptanone; lactone-ring-containing organic solvents such as γ-butyrolactone; polyhydric alcohol derivatives, including ester-bond-containing compounds such as ethylene glycol monoacetate, diethylene glycol monoacetate, propylene glycol monoacetate, and dipropylene glycol monoacetate, and ether-bond-containing compounds such as monoalkyl ethers, for example, monomethyl ether, monoethyl ether, monopropyl ether, and monobutyl ether, or monophenyl ethers of the above polyhydric alcohols or the above ester-bond-containing compounds, and the like; cyclic ethers such as dioxane and esters such as methyl lactate, ethyl lactate, methyl acetate, ethyl acetate, butyl acetate, methyl pyruvate, ethyl pyruvate, methyl methoxypropionate, and ethyl ethoxypropionate; aromatic organic solvents such as anisole, ethyl benzyl ether, cresyl methyl ether, diphenyl ether, dibenzyl ether, phenetole, butyl phenyl ether, ethylbenzene, diethylbenzene, amylbenzene, isopropylbenzene, toluene, xylene, cymene, and mesitylene; and nitrogen-containing organic solvents such as N,N,N',N'-tetramethylurea, N,N,2-trimethylpropionamide, N,N-dimethylacetamide, N,N-dimethylformamide, N,N-diethylacetamide, N,N-diethylformamide, 1,3-dimethyl-2-imidazolidinone, N-methylpyrrolidone, and N-ethylpyrrolidone. Two or more of these solvents may be used in combination.

Among these solvents, propylene glycol monomethyl ether acetate (PGMEA), propylene glycol monomethyl ether (PGME), N,N,N',N'-tetramethylurea, and butanol are preferable.

It is also preferred that the solvent (S) includes a cycloalkyl acetate represented by the following formula (S1). The film-forming composition includes a solvent (S) including a cycloalkyl acetate represented by the following formula (S1) together with the silicon-containing resin (A), thereby easily inhibiting the occurrence of cracks in a silica-based coating formed using the film-forming composition.

[Chem. 11]

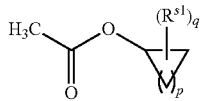

(In the formula (S1), $R^{s1}$ is an alkyl group having 1 or more and 3 or less carbon atoms, p is an integer of 1 or more and 6 or less, and q is an integer of 0 or more and (p+1) or less.)

Specific examples of the cycloalkyl acetate represented by the formula (S1) include cyclopropyl acetate, cyclobutyl acetate, cyclopentyl acetate, cyclohexyl acetate, cycloheptyl acetate, and cyclooctyl acetate. Among these, cyclooctyl acetate is preferable because acquisition thereof is easy, and the occurrence of cracks is easily inhibited. Two or more cycloalkyl acetates represented by the formula (S1) may be combined as the solvent (S).

The content of the cycloalkyl acetate represented by the formula (S1) in the solvent (S) is not particularly limited, so long as the object of the present invention is not defeated. The content of the cycloalkyl acetate represented by the formula (S1) in the solvent (S) is typically, for example, 30% by mass or more, preferably 50% by mass or more, more preferably 70% by mass or more, and particularly preferably 90% by mass or more, and it may be 100% by mass.

When the silicon-containing polymer (A) included in the film-forming composition includes poly-silane chain or oligo-silane chain, the moisture content in the film-forming composition is preferably 0.5% by mass or less, more preferably 0.3% by mass or less, particularly preferably less than 0.3% by mass to inhibit cracks in a silica-based coating or easily form a silica-based coating with a low dielectric constant. Moisture in the film-forming composition is derived from the solvent (S) in most cases. Therefore, the solvent (S) is preferably dehydrated so that the moisture content in the film-forming composition falls within the above range.

The amount of the solvent (S) to be used is not particularly limited, so long as the object of the present invention is not defeated. From the viewpoint of film-forming properties, the solvent (S) is used so that the solid content concentration in the film-forming composition is preferably 1% by mass or more and 50% by mass or less and more preferably 10% by mass or more and 40% by mass or less.

<Other Components>

The film-forming composition may contain, in addition to the silicon-containing polymer (A) and the solvent (S), various components that are conventionally added to film-forming compositions used in various applications. Examples of other components include a photopolymerization initiator, an acid generator, a base generator, a catalyst, a silane coupling agent, an adhesion promoter, a dispersant, a surfactant, an ultraviolet absorber, an antioxidant, a defoaming agent, a viscosity modifier, a colorant, and the like. These components are blended, each in a typical amount, into the film-forming composition.

<Method for Producing Film-Forming Composition>

The method for producing the film-forming composition is not particularly limited. A typical method is to uniformly mix the components described above each in a predetermined amount and dissolve the solid matter in the solvent (S) to produce the film-forming composition. For removal of very small insoluble matter, the film-forming composition may be filtered through a filter with a desired pore size.

«Method for Forming Silicon-Containing Polymer Coating»

The method for forming a silicon-containing polymer coating includes
forming a coated film by applying the above-described film-forming composition to a substrate, and
drying the coated film.

The method for forming a coated film is not particularly limited. For example, the film-forming composition is applied by a method such as a spraying method, a spin coating method, a roll coating method, a dipping method, or a drip method to form a coated film on a substrate. The thickness of the coated film is not particularly limited. Typically, the coated film is formed in a thickness such that a silicon-containing polymer coating with a thickness of preferably 0.1 nm or more and 20 µm or less, more preferably 0.5 nm or more and 1000 nm or less, further preferably 0.5 nm or more and 500 nm or less, and particularly preferably 1 nm or more and 10 nm or less can be formed.

Materials for the substrate are not particularly limited, and those which can withstand baking are preferable. Suitable examples of the materials for the substrate include inorganic materials such as metal, silicon, and glass, various materials conventionally used as materials for wafers (semiconductor wafers) and heat-resistant materials such as polyimide resin and polyamide-imide resin. The thickness of a substrate is not particularly limited, and the substrate may also be a film or a sheet.

The substrate may have a raised portion and/or a recessed portion. The raised portions are, for example, an uneven portion on a wafer substrate caused in a lithography process, a raised form on a gate electrode, and various devices such as LED devices and organic EL devices. The recessed portion is formed, for example, by etching the surface of a substrate. When the film-forming composition according to the present invention is used, a coated film, in which the film thickness is uniform even when a substrate has raised and recessed portions on the surface thereof, and which is along the raised and recessed forms on the surface of the substrate, is easily formed.

The thus formed coated film is then dried. The drying method of the coated film includes air drying and baking treatment at a temperature in the range of 60° C. or more and 150° C. or less. By the drying treatment, a silicon-containing polymer coating film that has protective functions such as anti-oxidation is formed on the substrate surface. The silicon-containing polymer coating film is also useful as a precursor film for the silica-based coating, which will be described below.

«Method for Forming Silica-Based Coating»

A method for forming a silica-based coating includes:
applying the film-forming composition to a substrate to form a coated film; and
forming a silicon-containing polymer coating from the coated film and then baking the silicon-containing polymer coating or baking the coated film.

When the film-forming composition includes a curing agent that decomposes and generates a base under the action of light, it is preferable to include an exposing step. The exposing step may be performed instead of or together with a baking step. In the exposing step, for example, the coated film formed may be selectively exposed. When selective exposure treatment is included, a developing step may be included. For example, when the film-forming composition can be cured by exposure, imprint lithography may be performed to the coated film formed. When performing imprint lithography, the method includes, for example,
forming a coated film by applying a film-forming composition onto a substrate;
pressing a mold on which an uneven structure with a predetermined pattern is formed, against the coated film; and exposing the coated film. The exposing step is performed on the coated film including the film-forming composition, while the mold is pressed against the coated film. After curing by exposure, the mold is peeled off, and then performing baking, it is possible to obtain a silica-based coating which is patterned according to the shape of the mold.

A method for forming a coated film is the same as the method for forming a coated film in the method for forming the silicon-containing polymer coating film. Thickness of the coated film is not particularly limited. Typically, the coated film is formed at a thickness such that a silica-based coating with a thickness of preferably 0.01 μm or more and 20 μm or less, more preferably 2.0 μm or more and 20 μm or less, and most preferably 5.0 μm or more and 10 μm or less can be formed.

The aforementioned silicon-containing polymer is alkali-soluble or becomes soluble in an alkaline aqueous solution by heating or other means. Therefore, even if misalignment or uneven film thickness occurs during the formation of the coated film, the coated film can be easily peeled off using an alkaline stripping solution.

Material of a substrate is not particularly limited, but a material that can withstand baking is preferable. A preferable example of a material for a substrate is the same as a preferable example of a material for the substrate in the method for forming the silicon-containing polymer coating. The thickness of substrates is not particularly limited, and the substrate may be a film or a sheet.

There may be protrusions or recesses on the substrate. Protrusions include, for example, level difference on a wafer substrate occurred during a lithography step, a protrusive shape of a gate electrode, and various elements such as LED elements and organic EL elements. Recesses are formed, for example, by etching a substrate surface. When the film-forming composition of the present invention is used, the film thickness is uniform even when the substrate surface is uneven, and it is easy to form a coated film that follows an uneven shape of the substrate surface.

After forming a coated film on a substrate, the coated film is dried to form a silicon-containing polymer coating, and the silicon-containing polymer coating is then baked, or the coated film is then baked to form a silica-based coating. The drying method is as described in the method for forming a silicon-containing polymer coating. The baking method is not particularly limited, and baking is typically carried out using an electric furnace or the like. A typical baking temperature is preferably 200° C. or more, more preferably 300° C. or more, and further preferably 350° C. or more. The upper limit is not particularly limited, but it is, for example, 1000° C. or less, preferably 500° C. or less, and more preferably 400° C. or less. In cases where the film-forming composition includes the curing agent (B) and/or the nitroxy compound (C), a silica-based coating with a lower dielectric constant can be formed, and the amount of residue remaining in the silica-based coating (an impurity derived from the silica-based coating) can be reduced even when the lower limit of the baking temperature is lowered to 200° C. The atmosphere for the baking is not particularly limited, and the baking may be carried out in an inert gas atmosphere such as a nitrogen atmosphere or an argon atmosphere, in a vacuum, or under reduced pressure. The baking may be carried out in the atmosphere or with appropriate control of the oxygen concentration. When both the drying step and the baking step are carried out, the steps may be continuously carried out, or another substrate treatment step may be carried out between the steps.

The silica-based coating thus formed has a film thickness of, for example, 2.0 μm or more and 20 μm or less. The silica-based coating formed in accordance with the above method is suitably used in applications such as an interlayer insulation material. In addition, the amount of residue remaining in the silica-based coating (an impurity derived from the silica-based coating) can be reduced.

«Production Method for Silicon-Containing Polymer»

A preferred example of the production method for the above-described silicon-containing polymer will now be described. The preferred production method for the above-described silicon-containing polymer is
a method including causing an ene-thiol reaction between a precursor polymer which includes at least one of poly-siloxane or oligo-siloxane chain and poly-silane chain or oligo-silane chain in a molecular chain and in which an unsaturated hydrocarbon group represented by the following formula (2-I) or a mercapto group-containing group represented by the following formula (2-II) is bound onto a silicon atom, and a carboxylic acid derivative represented by the following formula (1-I) or an unsaturated group-containing compound represented by the following formula (1-II).

The formula (2-I), formula (2-II), formula (1-I) and formula (1-II) are as shown below:

$$—R^4—CR^5=CH_2 \qquad (2\text{-}I)$$

$$—R^1—SH \qquad (2\text{-}II)$$

$$HS—R^2—(CO—O—R^3)_n \qquad (1\text{-}I)$$

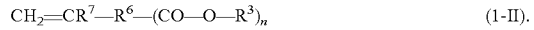

$$CH_2=CR^7—R^6—(CO—O—R^3)_n \qquad (1\text{-}II).$$

In the formula (2-I), $R^4$ is a single bond or a hydrocarbon group having 1 or more and 8 or less carbon atoms, $R^5$ is a hydrogen atom or a hydrocarbon group having 1 or more and 8 or less carbon atoms. In cases where both $R^4$ and $R^5$ are hydrocarbon groups, the sum of the number of carbon atoms in the hydrocarbon group as $R^4$ and the number of carbon atoms in the hydrocarbon group as $R^5$ is 2 or more and 8 or less.

In the formula (1-II), $R^3$ and n are the same as the $R^3$ and n in the formula (1). $R^6$ is a single bond or a hydrocarbon group having 1 or more and 8 or less carbon atoms. $R^7$ is a hydrogen atom or a hydrocarbon group having 1 or more and 8 or less carbon atoms. In cases where both $R^6$ and $R^7$ are hydrocarbon groups, the sum of the number of carbon atoms in the hydrocarbon group as $R^6$ and the number of carbon atoms in the hydrocarbon group as $R^7$ is 2 or more and 8 or less.

A precursor polymer which includes poly-siloxane chain or oligo-siloxane chain in a molecular chain and in which an unsaturated hydrocarbon group represented by the following formula (2-I) or a mercapto group-containing group represented by the following formula (2-II) is bound onto a silicon atom can be produced, for example, by hydrolytic condensation of an alkoxysilane compound having a structure corresponding to the structure of siloxane chain as described above about the poly-siloxane chain or oligo-siloxane chain.

The method for introducing a group represented by the formula (2-I) or a group represented by the formula (2-II) into poly-silane chain or oligo-silane chain is not particularly limited. Typically, a halosilane having a group represented by the formula (2-I) or a group represented by the formula (2-II) is independently polymerized or is copolymerized with another halosilane in the presence of metallic magnesium to form poly-silane chain or oligo-silane chain having a group represented by the formula (2-I) or a group represented by the formula (2-II).

The above-described silicon-containing polymer is obtained by an ene-thiol reaction between a precursor polymer which includes at least one of poly-siloxane or oligo-siloxane chain and poly-silane or oligo-silane chain in a molecular chain and in which an unsaturated hydrocarbon group represented by the formula (2-I) is bound onto a silicon atom, and a carboxylic acid derivative represented by the formula (1-I). As the unsaturated hydrocarbon group represented by the formula (2-I), a vinyl group and an allyl group are preferable. As the carboxylic acid derivative represented by the formula (1-I), 3-mercaptopropionic acid, methyl 3-mercaptopropionate, ethyl 3-mercaptopropionate, phenyl 3-mercaptopropionate, 4-mercaptobutyric acid, methyl 4-mercaptobutyrate, ethyl 4-mercaptobutyrate, and phenyl 4-mercaptobutyrate are preferable.

In addition, the above-described silicon-containing polymer can be obtained by an ene-thiol reaction between a precursor polymer which includes at least one of poly-siloxane chain or oligo-siloxane chain and poly-silane chain or oligo-silane chain in a molecular chain and in which a mercapto group-containing group represented by the formula (2-II) is bound onto a silicon atom, and an unsaturated group-containing compound represented by the formula (1-II). As the mercapto group-containing group represented by the formula (2-II), a mercaptomethyl group, a 2-mercaptoethyl group, and a 3-mercaptopropyl group are preferable. As the unsaturated group-containing silane compound represented by the formula (1-II), acrylic acid, methyl acrylate, ethyl acrylate, phenyl acrylate, methacrylic acid, ethyl methacrylate, and phenyl methacrylate are preferable.

Among these methods, the ene-thiol reaction between a precursor polymer in which an unsaturated hydrocarbon group represented by the formula (2-I) is bound onto a silicon atom and a carboxylic acid derivative represented by the formula (1-I) is preferably carried out, for example, because it is easy to prepare and acquire the precursor polymer.

The conditions of the ene-thiol reaction are not particularly limited, so long as the ene-thiol reaction proceeds well, and various conditions which have been conventionally used as the conditions of an ene-thiol reaction can be used. When carrying out the ene-thiol reaction, a radical generator may be used for the purpose of promoting the reaction. Specific examples of the radical generator include azo-based radical generators such as 2,2'-azobisisobutyronitrile (AIBN), 2,2'-azobis(2,4-dimethylvaleronitrile), 1,1'-azobis(cyclohexanecarbonitrile), dimethyl-2,2'-azobisisobutyrate, and dimethyl-2,2'-azobis(2-methylpropionate). These radical generators may be used alone, or two or more radical generators may be used in combination.

The ene-thiol reaction may be carried out in the presence of a solvent or without a solvent. The ene-thiol reaction is preferably carried out in the presence of a solvent because it is easy to allow the reaction to quickly and uniformly proceed. The solvent may be a polar solvent or a nonpolar solvent, and it is preferably a nonpolar solvent. Suitable specific examples of the solvent which can be used for the ene-thiol reaction include aliphatic hydrocarbon solvents such as pentane, hexane, heptane, octane, cyclohexane, cycloheptane, decalin, and norbornane; aromatic hydrocarbon solvents such as benzene, toluene, and xylene; ether solvents such as diethyl ether, dibutyl ether, tetrahydrofuran, and dimethoxyethane; ketone solvents such as acetone, methylethylketone, and cyclohexanone; halogenated hydrocarbon solvents such as dichloromethane and dichloroethane; alcohol solvents such as methanol, ethanol, n-propanol, and isopropanol; water; and the like. These solvents may be used alone, or two or more solvents may be used in combination. The amount of solvent used is not particularly limited. Typically, the amount is preferably 10 parts by mass or more and 5000 parts by mass or less, and more preferably 50 parts by mass or more and 2000 parts by mass or less with respect to a total of 100 parts by mass of material compounds.

The reaction temperature for the ene-thiol reaction is not particularly limited, so long as the reaction proceeds well. Typically, the reaction temperature is preferably 20° C. or more and 200° C. or less, more preferably 30° C. or more and 100° C. or less, and further preferably 40° C. or more and 80° C. or less from the viewpoint of reaction efficiency. The reaction time may be properly adjusted so that the ene-thiol reaction proceeds to a desired degree. Typically, the reaction time is preferably 1 hour or more and 96 hours or less, more preferably 2 hours or more and 48 hours or less, and further preferably 3 hours or more and 48 hours or less.

It should be noted that the above-described silicon-containing polymer can also be obtained by hydrolyzing a hydrolysable and condensable silane compound such as an alkoxysilane compound having a group represented by the formula (1), or by homo-polymerizing a halosilane having a group represented by the formula (1) or copolymerizing it with another halosilane in the presence of metallic magnesium.

EXAMPLES

The present invention will now be described in more detail by way of Examples, but the present invention is not limited to these Examples.

Synthesis Example 1

(Synthesis of Precursor Polymer (Methylvinylsilane Polymer))

In a round-bottom flask equipped with a three-way cock with an inner volume of 1000 ml, 43.45 g of granular magnesium (grain diameter 20 μm or more and 1000 μm or less), 5.26 g of tris(acetylacetonato)iron(III) as a catalyst, and 1.26 g of anhydrous lithium chloride were put. The atmosphere in the reactor was set to 50° C. and the pressure therein was reduced to 1 mmHg (=133 kPa) to dry the inside of the reactor (flask). After this, dry argon gas was introduced into the reactor, and 132.13 ml of tetrahydrofuran (THF) dried with sodium-benzophenone ketyl in advance was added to the reactor. Subsequently, the contents in the reactor were stirred at 25° C. for about 60 minutes. Next, 42.0 g (0.3 mol) of methylvinyldichlorosilane purified by distillation in advance was added to this reactor by a syringe and the reaction mixture in the reactor was stirred at 25° C. for about 24 hours. After completion of the reaction, 1000 ml of 1 N (=1 mol/L) hydrochloric acid was put in the reaction mixture, and a formed precursor polymer was then extracted by 500 ml of toluene. The toluene phase was washed with 200 ml of pure water ten times, and the toluene phase was then dried over anhydrous magnesium sulfate. Subsequently, toluene was distilled off from the toluene phase to give 35.81 g of a linear methylvinylsilane polymer (mass average molecular weight (Mw)4000).

Synthesis Example 2

A methylvinylsilane polymer was obtained as a precursor polymer in the same manner as in Synthesis Example 1, except that the stirring time after adding methylvinyldichlorosilane was changed to 12 hours. The mass average molecular weight (Mw) of the obtained methylvinylsilane polymer was 1900.

Synthesis Example 3

A methylvinylsilane polymer was obtained as a precursor polymer in the same manner as in Synthesis Example 1, except that the stirring time after adding methylvinyldichlorosilane was changed to 48 hours. The mass average molecular weight (Mw) of the obtained methylvinylsilane polymer was 7000.

Examples 1 to 3

In a 300 ml flask, 3.2 g of a precursor polymer described in Table 1, 2.4 g of thioglycolic acid, 0.32 g of AIBN, and 76 ml of tetrahydrofuran (THF) were put. The mixture in the flask was refluxed in an 80° C. water bath with stirring for about 6 hours. Subsequently, the mixture was dried in an evaporator to obtain a silicon-containing polymer having a 2-(carboxymethylthio)ethyl group as an objective substance. It was verified by IR that vinyl groups disappeared and carboxy groups were formed. The mass average molecular weights (Mw) of the obtained silicon-containing polymers are shown in Table 1.

TABLE 1

| | Precursor polymer | Molecular weight (MW) of silicon-containing polymer |
|---|---|---|
| Example 1 | Synthesis Example 2 | 2500 |
| Example 2 | Synthesis Example 1 | 5700 |
| Example 3 | Synthesis Example 3 | 10000 |

1 part by mass of each of the silicon-containing polymers obtained in Examples 1 to 3 was mixed with 4 parts by mass of cyclohexyl acetate and a film-forming composition was prepared. The film-forming composition obtained was applied to a substrate by spin coating, the substrate was prebaked at 90° C. for 2 minutes to form a film including the silicon-containing polymer on the substrate. The substrate having a film was immersed in an aqueous TMAH (tetramethyl ammonium hydroxide) solution for 5 seconds. Observing the substrate surface after immersion, the film on the substrate was confirmed to have been dissolved in all of Examples 1 to 3.

The invention claimed is:

1. A silicon-containing polymer, comprising poly-silane chain or oligo-silane chain in a molecular chain,
    wherein one or more groups represented by a following formula (1) are bound onto a silicon atom in the silicon-containing polymer;

$$-R^1-S-R^2-(CO-O-R^3)_n \qquad (1)$$

wherein, in the formula (1), $R^1$ and $R^2$ are each independently a hydrocarbon group having 1 or more and 10 or less carbon atoms, $R^3$ is a hydrogen atom or an organic group having 1 or more and 20 or less carbon atoms and being bound to the oxygen atom via a C—O bond, and n is an integer of 1 or 2.

2. The silicon-containing polymer according to claim 1, wherein the molecular chain consists of the poly-silane chain or oligo-silane chain.

3. The silicon-containing polymer according to claim 1, wherein the molecular chain is linear.

4. The silicon-containing polymer according to claim 1, wherein the number of moles of a group represented by the formula (1) is 0.05 mol or more and 2.0 mol or less with respect to 1 mol of silicon atom in the silicon-containing polymer.

5. The silicon-containing polymer according to claim 4, wherein the number of moles of a group represented by the formula (1) is 0.2 mol or more and 1.0 mol or less with respect to 1 mol of silicon atom in the silicon-containing polymer.

6. The silicon-containing polymer according to claim 1, wherein the $R^1$ is an ethane-1,2-diyl group.

7. A film-forming composition, comprising the silicon-containing polymer (A) according to claim 1 and a solvent (S).

8. A method for forming a silicon-containing polymer coating, the method comprising:
    forming a coated film by applying the film-forming composition according to claim 7 onto a substrate, and
    drying the coated film.

9. A method for forming a silica-based coating, the method comprising:
    forming a coated film by applying the film-forming composition according to claim 7 onto a substrate, and
    drying the coated film to form a silicon-containing polymer coating and then baking the silicon-containing polymer coating or baking the coated film.

10. A production method for the silicon-containing polymer according to claim 1, the production method comprising:

performing an ene-thiol reaction between a carboxylic acid derivative and a precursor polymer including poly-silane chain or oligo-silane chain in a molecular chain and including an unsaturated hydrocarbon group represented by a following formula (2-I) bound onto a silicon atom:

$$—R^4—CR^5{=}CH_2 \quad (2\text{-}I)$$

wherein, in the formula (2-I), $R^4$ is a single bond or a hydrocarbon group having 1 or more and 8 or less carbon atoms, $R^5$ is a hydrogen atom or a hydrocarbon group having 1 or more and 8 or less carbon atoms, and in cases where both $R^4$ and $R^5$ are hydrocarbon groups, a sum of the number of carbon atoms in the hydrocarbon group as $R^4$ and the number of carbon atoms in the hydrocarbon group as $R^5$ is 2 or more and 8 or less, wherein, the carboxylic acid derivative is represented by a following formula (1-I):

$$HS—R^2—(CO—O—R^3)_n \quad (1\text{-}I)$$

wherein, in the formula (1-I), $R^2$, $R^3$, and n are the same as the $R^2$, $R^3$, and n in the formula (1), or performing an ene-thiol reaction between an unsaturated group-containing compound and a precursor polymer including poly-silane chain or oligo-silane chain in a molecular chain and including a mercapto group-containing group represented by a following formula (2-II) bound onto a silicon atom:

$$—R^1—SH \quad (2\text{-}II)$$

wherein, in the formula (2-II), $R^1$ is the same as the $R^1$ in the formula (1), wherein, the unsaturated group-containing compound is represented by a following formula (1-II):

$$CH_2{=}CR^7—R^6—(CO—O—R^3)_n \quad (1\text{-}II)$$

wherein, in the formula (1-II) $R^3$ and n are the same as the $R^3$ and n in the formula (1), $R^6$ is a single bond or a hydrocarbon group having 1 or more and 8 or less carbon atoms, $R^7$ is a hydrogen atom or a hydrocarbon group having 1 or more and 8 or less carbon atoms, and in cases where both $R^6$ and $R^7$ are hydrocarbon groups, a sum of the number of carbon atoms in the hydrocarbon group as $R^6$ and the number of carbon atoms in the hydrocarbon group as $R^7$ is 2 or more and 8 or less.

11. The production method for the silicon-containing polymer according to claim 10, the method comprising performing an ene-thiol reaction between the precursor polymer in which the unsaturated hydrocarbon group represented by the formula (2-I) is bound onto a silicon atom and the carboxylic acid derivative represented by the formula (1-I).

12. A silicon-containing polymer, comprising poly-silane chain or oligo-silane chain in a molecular chain, wherein one or more groups represented by a following formula (1) are bound onto a silicon atom in the silicon-containing polymer;

$$—R^1—S—R^2—(CO—O—R^3)_n \quad (1)$$

wherein, in the formula (1), $R^1$ and $R^2$ are each independently a hydrocarbon group having 1 or more and 10 or less carbon atoms, $R^3$ is a hydrogen atom or an organic group having 1 or more and 20 or less carbon atoms and being bound to the oxygen atom via a C—O bond, where the organic group as $R^3$ is a hydrocarbon group, a halogenated hydrocarbon group, an alkoxyalkyl group, or a heteroaryl group, and n is an integer of 1 or 2.

* * * * *